United States Patent [19]

Yamakawa

[11] Patent Number: 4,875,184
[45] Date of Patent: Oct. 17, 1989

[54] FUZZY LOGIC COMPUTERS AND CIRCUITS

[75] Inventor: Takeshi Yamakawa, Kumamoto, Japan

[73] Assignee: Omron Tateisi Electronics Co., Kyoto, Japan

[21] Appl. No.: 116,777

[22] Filed: Nov. 5, 1987

[30] Foreign Application Priority Data

Nov. 13, 1986 [JP] Japan .................................. 61-268564

[51] Int. Cl.$^4$ .............................................. G07G 7/00
[52] U.S. Cl. ..................................... 364/807; 307/494; 307/201; 364/602
[58] Field of Search ............... 364/807, 513, 600, 601, 364/602, 604; 307/499, 201

[56] References Cited

U.S. PATENT DOCUMENTS 4,694,418 9/1987 Ueno et al. ........................... 364/807
4,716,540 12/1987 Yamakawa ........................... 364/807

OTHER PUBLICATIONS

"Comparison of Fuzzy Reasoning Methods", Fuzzy Sets and Systems, vol. 8, No. 3, pp. 253–283 (1982) by Masaharu Mizumoto and Hans-Jurgen Zimmerman.
"Fuzzy Controller Hardware System", Preprints of 2nd IFSA Congress, D5, Tokyo Japan Jul. 24–25 (1987) by Takeshi Yamakawa.
"An Approach to a Fuzzy Computer Hardware System", Proc. 2nd International Conf. on Artificial Intelligence, Marseille, France, Dec. 1–5 (1986) by T. Yamakawa.
"Fuzzy Memory Device", Preprints of 2nd IFSA Congress, pp. 551–555, Tokyo, Jul. 20–25 (1987) by Takeshi Yamakawa and Katsutoshi Sasaki.
"A Simple Fuzzy Computer Hardware System Employing Min. & Max. Operations-A Challenge to 6th Generation Computer-", Preprints of 2nd IFSA Congress, pp. 827–830, Tokyo, Jul. 2–25 (1987) by Takeshi Yamakawa.
L. Zadeh, "Fuzzy Logic", Computer Apr. 1988, pp. 83–93.
M. Mizumoto & H. Zimmerman, "Comparison of Fuzzy Reasoning Methods", Fuzzy Sets & System, vol. 8, 1982, pp. 253–283.
T. Yamakawa "A Simple Fuzzy Computer Hardware System Employing Max & Min. Operations," Reprints of Second IFSA Congress, Jul. 20–27, 1982, pp. 827–830.
T. Yamakawa "An Approach to a Fuzzy Computer Hardware System", Proc. 2nd International Conf. on Artificial Intelligence, Dec. 1–5, 1986, pp. 1–22.

Primary Examiner—Jerry Smith
Assistant Examiner—Charles B. Myer
Attorney, Agent, or Firm—Steven, Davis, Mille & Mosher

[57] ABSTRACT

A fuzzy computer basically includes a plurality of fuzzy membership function generator circuits, and a fuzzy inference engine for executing a predetermined fuzzy operation among fuzzy membership functions that have been generated. A fuzzy membership function is represented by electric signals distributed on a plurality of lines.

8 Claims, 26 Drawing Sheets

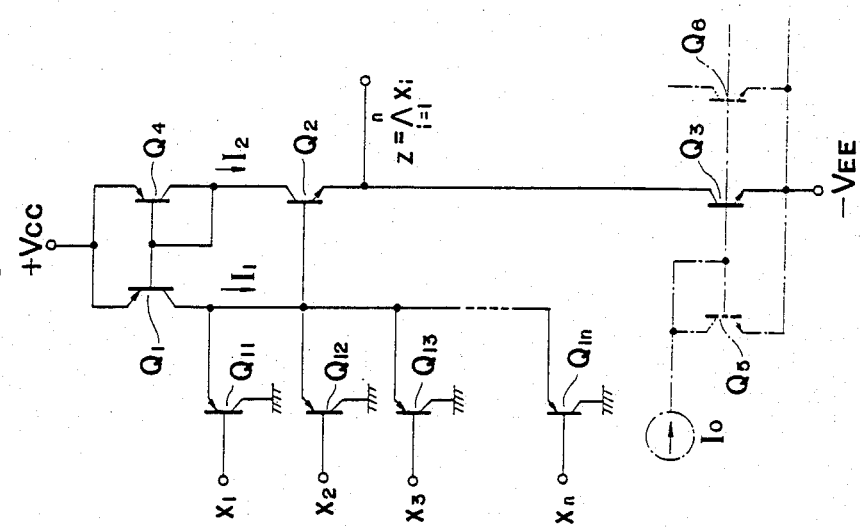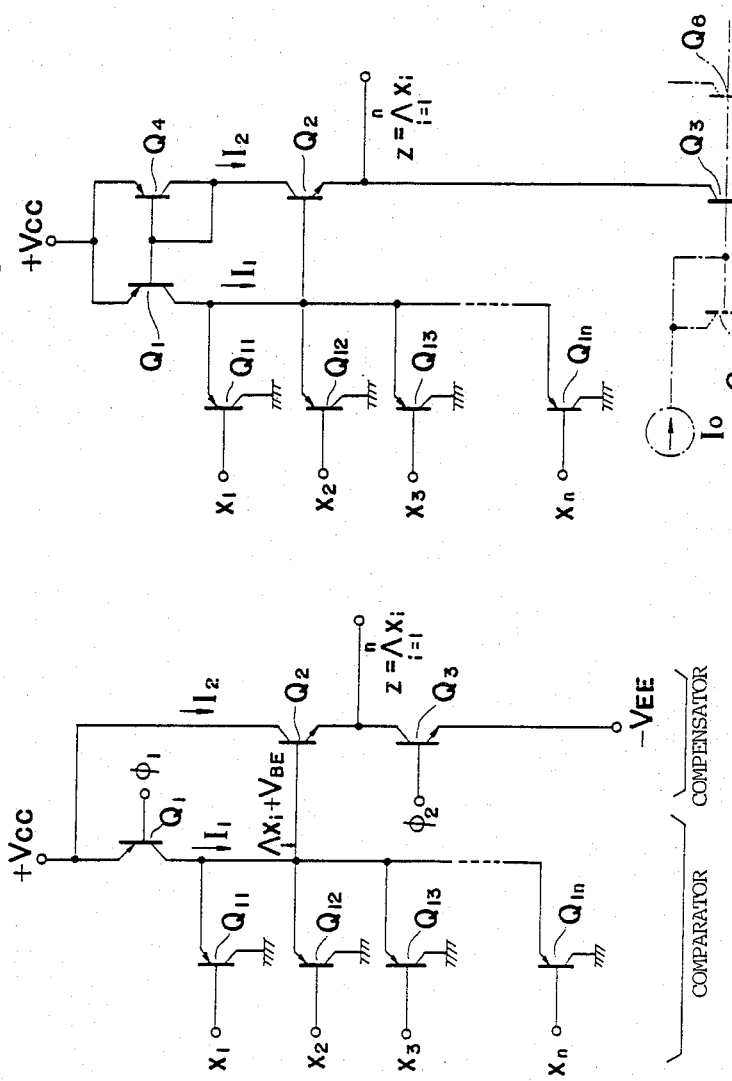

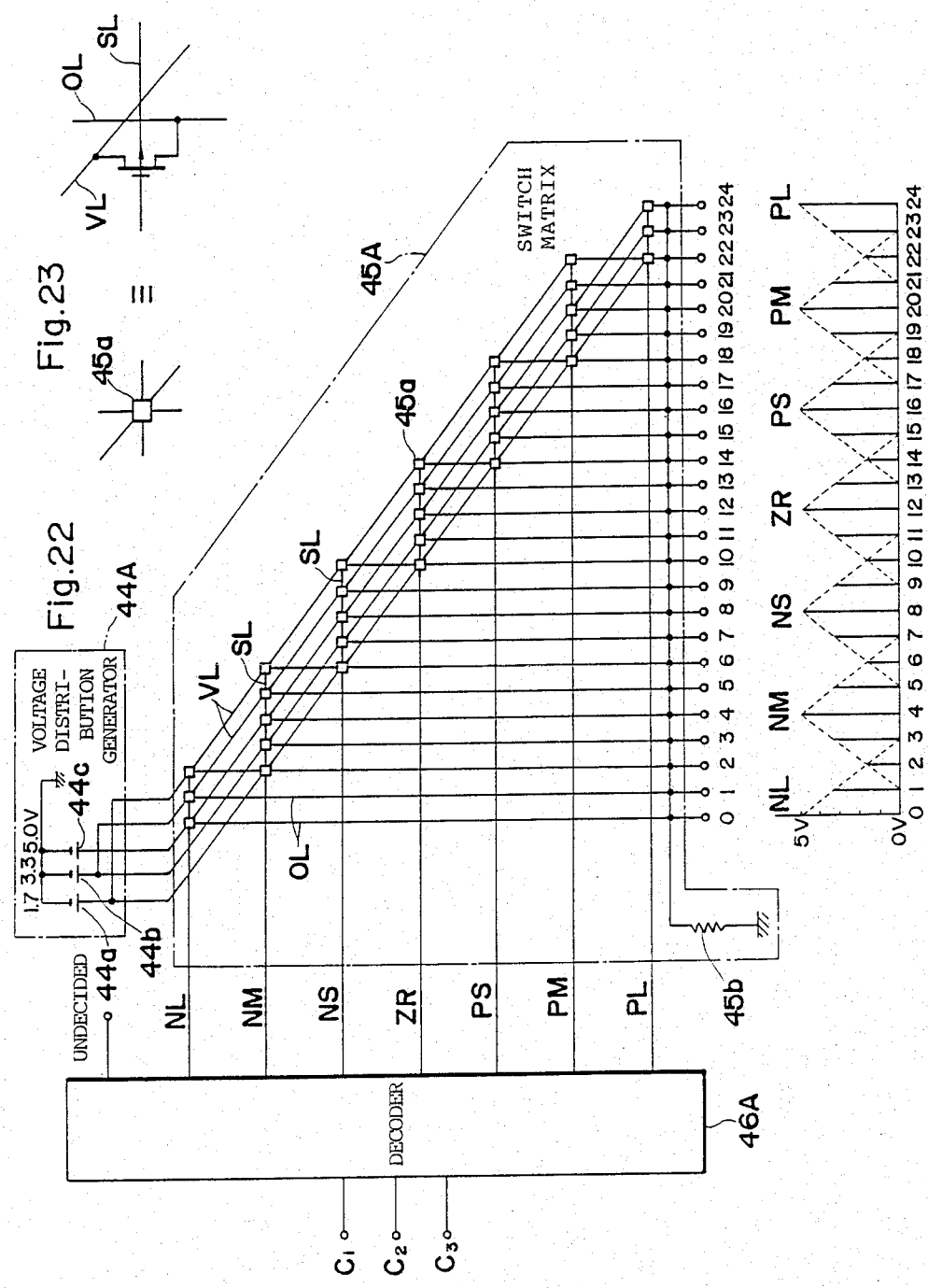

| LABEL | INPUT | | | OUTPUT | | | | | | |
|---|---|---|---|---|---|---|---|---|---|---|
| | C₁ | C₂ | C₃ | S₁ | S₂ | S₃ | S₄ | S₅ | S₆ | S₇ |
| PL | 1 | 1 | 1 | H | H | L | H | H | L | H |
| PM | 1 | 1 | 0 | H | L | H | H | H | L | H |
| PS | 1 | 0 | 1 | H | H | L | H | L | H | H |
| ZR | 1 | 0 | 0 | H | L | H | H | L | H | H |
| NS | 0 | 1 | 1 | L | H | H | H | L | H | H |
| NM | 0 | 1 | 0 | H | L | H | L | H | H | H |
| NL | 0 | 0 | 1 | L | H | H | L | H | H | H |
| UNDECIDED | 0 | 0 | 0 | H | H | H | H | H | H | L |

FUZZY LOGIC COMPUTERS AND CIRCUITS

BACKGROUND OF THE INVENTION

This invention relates to fuzzy computers.

The digital computer was created by harmonizing the concept of a stored program, Boolean algebra and the stable operation of binary hardware, and the comprehensive development of logic and thorough processing of data have been made possible by the continuous operation of such a computer. The stable operation of the digital computer assures high reliability, and digital computer systems are continuing to grow in scale. A digital computer is capable of being programmed at will as long as the program does not contain information on the same mental level as that of human beings. In this sense, a digital computer is even referred to as a general-purpose machine. The realization of digital computer systems is greatly revolutionizing human life and human society.

The very important concept of "fuzziness" has come about by considering what and how human beings think and how they communicate with one another. L. A. Zadeh proposed the concept of fuzzy sets in 1965. Since then, theoretical studies concerning fuzziness have found their way into print in a large number of technical papers, but reports on applications are still few and these have merely relied upon the assistance of binary digital computers.

Research on fuzziness emphasizes that human knowledge is based on accummulated experience that is to be generalized in the form of linguistic information, as is the know-how possessed by specialists. This linguistic information generally possesses vagueness, obscurity, uncertainty, incompleteness or impreciseness and is characterized by a membership function. The grade of membership is expressed by numerical values in the region of from 0.0 to 1.0 and varies within this range.

When linguistic information is handled by a digital computer, the grades (values) of membership are represented by binary codes. The binary-coded values are stored, transferred and operated on again and again in binary electronic circuits in accordance with a stored program. As a result, a long period of time is required to process fuzzy information by a digital system. Furthermore, the binary-coded values require an unbelievably large number of elements in order to be stored and operated upon. Though a digital computer is indeed a general-purpose machine as mentioned above, it is not necessarily best suited to the real-time processing of fuzzy information. Thus, there is need of another type of machine capable of processing fuzzy information effectively and at high speed.

SUMMARY OF THE INVENTION

An object of the present invention is to provide a hardware system suitable for processing fuzzy information, namely a novel system referred to as a "fuzzy computer".

According to the present invention, the foregoing object is attained by providing a fuzzy computer comprising a plurality of membership function generator circuits each for generating electric signals, which are distributed on a plurality of lines, representing a predetermined fuzzy membership function, and a fuzzy inference engine which receives as inputs the electric signals outputted by the plurality of membership function generator circuits for executing a predetermined fuzzy operation and for outputting the result of the operation as electric signals distributed on a plurality of lines.

The fuzzy membership function is a set of function values (grades) corresponding to a plurality of variables. In accordance with the present invention, the plurality of variables are given concrete form by the plurality of signal lines, and each value of the fuzzy membership function is represented by an analog electric signal which appears on each signal line. That is, the fuzzy membership function is expressed by electric signals distributed on the plurality of signal lines.

In a fuzzy computer according to the invention, the analog signals distributed on the plurality of signal lines representing a predetermined fuzzy membership function are outputted by each of the plurality of fuzzy membership function generator circuits. The fuzzy inference engine subjects these analog electric signals to a predetermined operation in their existing form and also outputs a membership function, which represents the results of the operation, as a distribution of electric signals.

Since the fuzzy membership function is not coded into binary values as is done in a conventional digital computer, the arithmetic operations are performed at higher speed and real-time processing is made feasible. In addition, the fuzzy computer according to the invention has a form most suitable for fuzzy information processing.

BRIEF DESCRIPTION OF THE DRAWINGS

FIG. 1a is a circuit diagram illustrating an example of an n-input, 1-output MIN circuit, FIG. 1b is a circuit diagram illustrating an improvement over the circuit of FIG. 1a, and FIG. 2 is a circuit diagram illustrating an n-input, 1-output MAX circuit.

FIGS. 3a, 3b, 4a, 4b, 5a, 5b and 6 show classes of MIN circuits or MAX circuits, in which FIG. 3a illustrates the concept of a corresponding MIN (C-MIN) or corresponding MAX (C-MAX) circuit and FIG. 3b the symbol thereof; FIG. 4a illustrates the concept of an ensemble MIN (E-MIN) or ensemble MAX (E-MAX) circuit and FIG. 4b the symbol thereof; FIG. 5a illustrates the symbol of a cartesian product (or direct product) MIN circuit (CP-MIN) and FIG. 5b the simplified circuit thereof; and FIG. 6 is a circuit diagram illustrating a concrete example of a circuit symbolized as the intersections of lines in FIG. 5b.

FIG. 22 is a circuit diagram illustrating a fuzzy membership function generator circuit realized by using a switch matrix, and FIG. 23 illustrates the concrete construction of a symbol used in FIG. 22.

DETAILED DESCRIPTION OF THE PREFERRED EMBODIMENTS

1. Fuzzy inferences

Rules based on human experience can be expressed in their simplest form by the following proposition:

"If x is A, then y is B."

Here "if x is A" is referred to as an "antecedent", and "then y is B" is referred to as a "consequent". If A and B are items of vague linguistic information such as "tall", "old man" and "positive, small value", then it will be possible to characterize them by fuzzy membership functions, as mentioned above. That is, A and B are fuzzy sets. (In a description of specific circuits given hereinbelow, A, B and the like indicate fuzzy membership functions or voltage distributions that represent fuzzy membership functions.)

The abovementioned proposition can be simply expressed as $x = A \rightarrow y = B$ Consider an inference of the following form:
Human beings often make inferences in which fuzzy expressions are included in the antecedent and consequent. An inference of this type can not be satisfactorily implemented using classic Boolean logic.

| Implication: | $x = A \rightarrow y = B$ |
| --- | --- |
| Premise: | $x = A'$ |
| Conclusion: | $y = B'$ |

This form of inference is referred to as a "generalized modus ponens", in which the conclusion is inferred from the given premise when an implication exists. A large number of implication rules can exist, as follows:

| Implication 1: | $x = A_1 \rightarrow y = B_1$ | else or and |
| --- | --- | --- |
| Implication 2: | $x = A_2 \rightarrow y = B_2$ | else or and |
| . | . | . |
| . | . | . |
| . | . | . |
| Implication r: | $x = A_r \rightarrow y = B_r$ | |
| Premise: | $x = A'$ | |
| Conclusion: | $y = B'$ | |

A large number of implications are connected by "else" or "and".

There is also an inference of the following form:

| Implication: | $x = A \rightarrow y = B$ |
| --- | --- |
| Premise: | $x = B'$ |
| Conclusion: | $y = A'$ |

This form of inference is referred to as a "generalized modus tollens".

Figure 31:
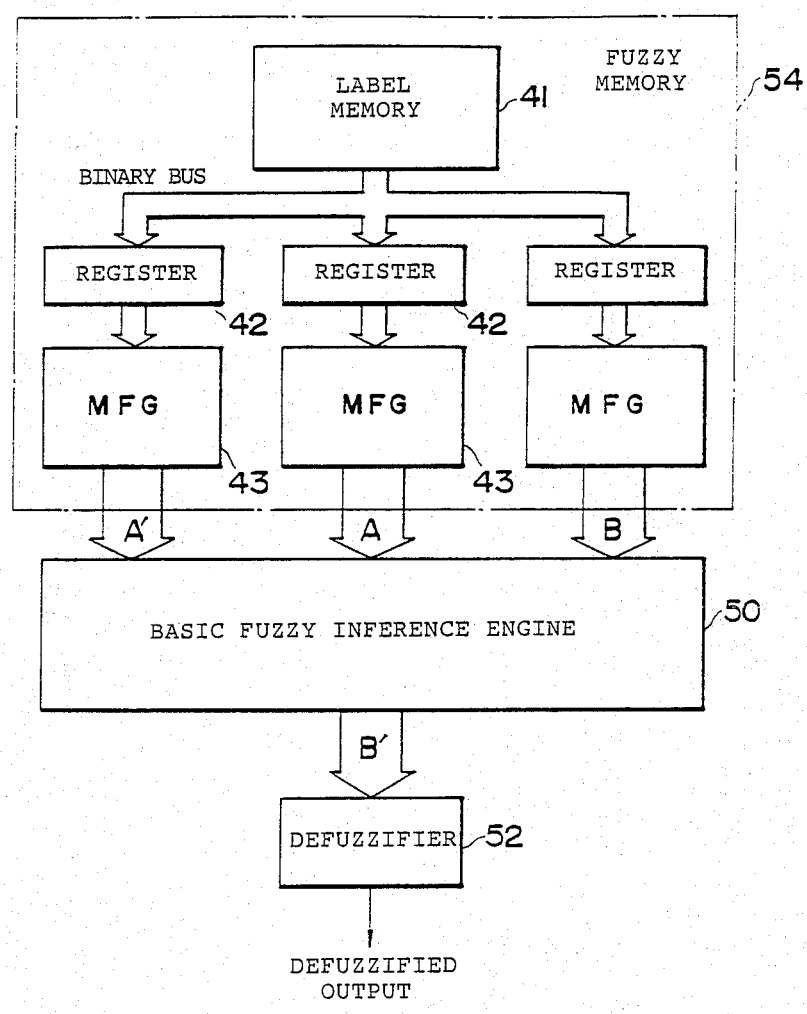
FIG. 31 is a block diagram illustrating the concept of a fuzzy computer.

Basically, a fuzzy computer is composed of a fuzzy memory storing the abovementioned implication rules and a fuzzy inference engine which implements modus ponens-type fuzzy inferences (see FIG. 31).

A further analysis of a modus ponens fuzzy inference will now be given.

We will consider the concept of a "fuzzy relation from A to B", which is expressed by $R_{AB}$ ( referred to simply as R).

In general, when the following holds:

$A = \{a_1, a_2, \ldots, a_i, \ldots, a_m\}$
$B = \{b_1, b_2, \ldots, b_j, \ldots, b_n\}$ a fuzzy relation R from A to B is expressed as follows:

$$R = \begin{bmatrix} r_{11} & r_{12} & \cdots & r_{1j} & \cdots & r_{1n} \\ r_{21} & & & & & \\ \cdot & & & & & \\ \cdot & & & & & \\ \cdot & & & & & \\ r_{i1} & & & r_{ij} & & \cdot \\ \cdot & & & & & \\ \cdot & & & & & \\ \cdot & & & & & \\ r_{m1} & & \cdots & & & r_{mn} \end{bmatrix}$$

Various operations representing this fuzzy relation have been proposed. For the details, see Masaharu Mizumoto and Hans-Jurgen Zimmermann, "Comparison of Fuzzy Reasoning Methods", Fuzzy Sets and Systems, Vol. 8, No. 3, pp. 253–283 (1982).

An example of a typical fuzzy relation already proposed is as follows:

$$r_{ij} = a_i \wedge b_j \quad \text{MIN Operation Rule} \quad (1)$$

$$r_{ij} = (a_i \wedge b_j) \vee (1 - a_i) \quad \text{MAX Rule}$$

$$r_{ij} = 1 \wedge (1 - a_i \vee b_j) \quad \text{Arithmetic Rule}$$

The MIN operation rule expressed by Eq. (1) is the best known and its effectiveness in industrial applications has been demonstrated. In the present embodiment, therefore, the operation rule of Eq. (1) is employed. However, it goes without saying that the other operation rules are applicable as well.

When the premise (x=A') is given for one implication rule (x=A→y=B), as mentioned above, a "compositional rule of inference" for a case where the conclusion (y=B') is inferred from the above is expressed as follows using the fuzzy relation R:

$$\begin{aligned} B' &= A' \circ R \\ &= [a_1', a_2', \ldots, a_i', \ldots, a_m'] \circ \begin{bmatrix} r_{11} & \cdots & r_{1n} \\ \vdots & & \vdots \\ & r_{ij} & \\ \vdots & & \vdots \\ r_{ml} & \cdots & r_{mn} \end{bmatrix} \\ &= [b_1', b_2', \ldots, b_j', \ldots, b_n'] \end{aligned}$$

Various operations have also been proposed for the operation ∘ in the above equation. For example, there are those using a MIN/MAX operation, an algebraic product/MAX operation, etc. In the present embodiment, the MIN/MAX operation, which is used most commonly, is employed as the operation ∘.

Accordingly, if the MIN/MAX operation is used as the ∘ operation and the Eq. (1) is used as the fuzzy relation, the conclusion $b_j'$ based on the compositional rule of inference is expressed as follows:

$$\begin{aligned} b_j' &= (a_1' \wedge r_{ij}) \vee (a_2' \wedge r_{2j}) \vee \cdots \\ & \vee (a_i' \wedge r_{ij}) \vee \cdots \vee (a_m' \wedge r_{mj}) \\ &= \bigvee_{i=1}^{m} a_i' \wedge r_{ij} \quad (2) \\ &= \bigvee_{i=1}^{m} a_i' \wedge (a_i \wedge b_j) \\ &= \bigvee_{i=1}^{m} a_i' \wedge a_i \wedge b_j \quad (3) \\ &= b_j \wedge \bigvee_{i=1}^{m} (a_i' \wedge a_i) \quad (4) \end{aligned}$$

The operations of these Eqs. (2), (3) and (4) are executed by the fuzzy inference engine constituting the principal part of the fuzzy computer, as mentioned above. It will be appreciated from these equations that the fuzzy inference engine is primarily constituted by MIN circuits and MAX circuits.

Before discussing the construction of the fuzzy inference engine, therefore, the MIN circuit, MAX circuit and other basic circuits will be described. Though voltage signals and current signals may serve as analog electric signals that indicate the values (grades) of membership functions, the following discussion will take a circuit that operates in a voltage mode as an example.

2. MIN circuits, MAX circuits and other basic circuits (1) MIN circuits, MAX circuits FIG. 1a illustrates an example of an n-input, 1-output MIN circuit constructed using bipolar transistors. The circuit executes the operation $$z = \bigwedge_{i}^{n} x_i$$

where the input voltages are $x_1, x_2, \ldots x_n$ and the output voltage is z. In other words, the circuit generates an output voltage equal to the smallest input voltage.

This MIN circuit is composed of a comparator and compensator. The comparator is constituted by n-number of PNP transistors $Q_{11}, Q_{12}, Q_{13} \ldots, Q_{1n}$ connected together at their emitters, and a transistor $Q_1$ serving as a current source for driving these transistors. The input voltages $x_1 - x_n$ are applied to the bases of the transistors $Q_{11} - Q_{1n}$, respectively. A reference voltage $\phi_1$ is impressed upon the base of transistor $Q_1$ in such a manner that a predetermined constant current $I_1$ will flow into the transistor $Q_1$. Since the transistor among the transistors $Q_{11} - Q_{1n}$ that has the lowest input voltage (represented by $V_{min}$) impressed upon its base is rendered conductive, the other transistors assume the cut-off state. Accordingly, a voltage obtained by adding the emitter-base voltage $V_{EB}$ of the transistor rendered conductive to this input voltage $V_{min}$, namely a voltage $$V_{min} + V_{EB} = \bigwedge_{i}^{n} x_i + V_{EB}$$

($V_{EB}$ is on the order of 0.7 V), appears at the emitters. If two input voltages are equal in value and lower than the other input voltages, a current of $I_1/2$ will flow into each of the transistors to which these two input voltages are applied. The results, therefore, are the same. The same will be true if three or more of the input voltages are equal and lower than the other input voltages.

The compensator is for the purpose of compensating the voltage $V_{EB}$ that appears as a MIN operation error at the output of the comparator. The compensator is composed of an NPN transistor $Q_2$ and a transistor $Q_3$ serving as a current source for driving the transistor $Q_2$. A voltage $\phi_2$ necessary for a constant current $I_2$ to flow is applied to the base of the transistor $Q_3$. The emitter of transistor $Q_2$ is connected to the output terminal of the MIN circuit. The result of subtracting the base-emitter voltage $V_{BE}$ of transistor $Q_2$ from the comparator output voltage is that the output voltage z is expressed by $$\bigwedge_{i}^{n} x_i.$$

The transistors $Q_1$, $Q_3$ serving as current sources can be substituted by resistors. Also, one PNP transistor having its emitter connected to the power supply $V_{CC}$ can be provided, in which case this transistor and the transistor $Q_1$ would form a current mirror. It can also be arranged so that a desired current $I_1$ will flow by adjusting a resistor connected in series with this newly provided transistor.

FIG. 1b illustrates an improved MIN circuit, in which elements similar to those shown in FIG. 1a are designated by like reference characters.

In the MIN circuit of FIG. 1a, the $V_{EB}$'s of transistors $Q_{11}-Q_{1n}$ are not necessarily of the same value. However, let the emitter-base voltage be $V_{EBi}$ provisionally, considering transistor $Q_{1i}$ as being representative. Let the $V_{BE}$ of transistor $Q_2$ be $V_{BE2}$. Full compensation of the error in the MIN operation by means of the compensator takes place when $V_{EBi}=V_{BE2}$. That is, assuming that the transistors $Q_{11}-Q_{1n}$ and $Q_2$ have exactly the same $V_{EB}-I_E$ (or $V_{BE}-I_E$) characteristic, the error will be 0 when $I_1=I_2$ holds. In order to establish the relationship $I_1=I_2$ with the circuit of FIG. 1a, the voltages $\phi_1$, $\phi_2$ must be adjusted.

In the improved circuit of FIG. 1b, a transistor $Q_4$ is provided in series with the transistor $Q_2$, and the transistors $Q_4$ and $Q_1$ construct a current mirror. If a constant current $I_2$ is passed through the transistor $Q_2$, a current $I_1$ satisfying the condition $I_1=I_2$ will flow into the transistor $Q_1$, so that no adjustment of the voltages $\phi_1$, $\phi_2$ is required. Further, if a transistor $Q_5$ is provided to construct a current mirror with the transistor $Q_3$ serving as the current source and the transistor $Q_5$ is driven by a current source $I_0$, then $I_2=I_0$ will hold at all times. In other words, a constant current is capable of flowing at all times irrespective of any fluctuation in the power supply voltages $V_{CC}$, $-V_{EE}$. Such a circuit will be highly resistant to power supply fluctuations. Drive can be achieved by the single current source $I_0$ by constructing a current mirror using the transistor $Q_5$ and a transistor $Q_6$ serving as a current source of another MIN circuit.

Though this improvement is effective when an extremely rigid operation is considered, no practical problems are encountered even if the currents $I_1$, $I_2$ are different, as will be set forth later in a discussion of a controlled MIN-MAX circuit.

Figure 2:
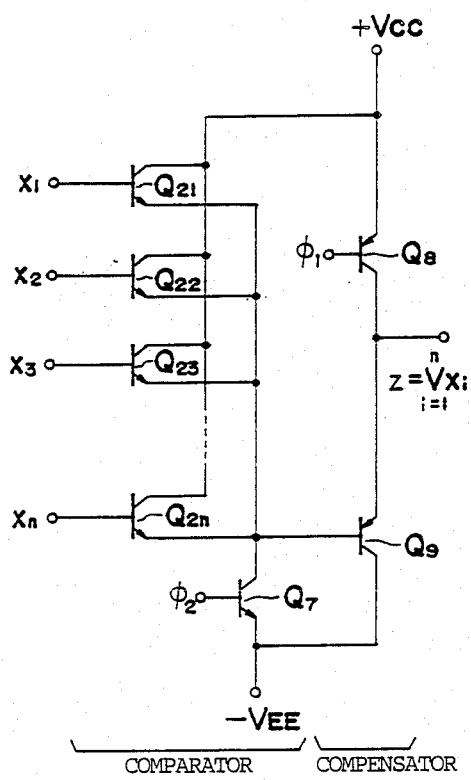

FIG. 2 shows an example of a MAX circuit. The MAX circuit is also composed of a comparator and compensator. The comparator is constituted by emitter-connected NPN transistors $Q_{21}$, $Q_{22}$, ..., $Q_{2n}$ whose bases are controlled by input voltages $x_1$, $x_2$, ..., $x_n$, respectively, and a transistor $Q_7$ for driving these transistors. Only the transistor among the transistors $Q_{21}-Q_{2n}$ that has the highest input voltage (represented by $V_{max}$) impressed is rendered conductive, so that a voltage equivalent to $V_{max}-V_{BE}$ appears at the emitters. The error in $-V_{BE}$ is compensated by the compensator, which comprises a PNP transistor $Q_9$ and a transistor $Q_8$ serving as a current source. As a result, an output voltage z equivalent to $$V_{max} = \overset{n}{\underset{i}{\cup}} x_n$$

appears at the output terminal. It goes without saying that this MAX circuit can be improved in accordance with the approach illustrated in FIG. 1b.

In these MIN and MAX circuits, the input voltages $x_1-x_i$ represent fuzzy truth values [each value (grade) of a membership function]. Fuzzy truth values are continuous values [0,1] of from 0 to 1. In correspondence with this, the input voltages are set at e.g. [0 V, 5 V].

Since all of the transistors in the above-described MIN and MAX circuits are connected together at their emitters, these circuits are named "emitter-coupled fuzzy logic gates" (ECFL gates).

The above-described MIN and MIX circuits can be considered as two cascade-connected emitter followers driven by the current sources (transistors $Q_1$, $Q_3$, $Q_7$, $Q_8$) Accordingly, these circuits exhibit a very high input impedance and a very low output impedance. This fact indicates that these circuits are highly resistant to external noise and exhibit little cross-talk. This means that a number of circuits can be connected in succeeding stages.

Since the aforementioned MIN and MAX circuits are driven by current sources, the transistors do not saturate. In other words, an effect in which minority carriers are stored in the base region does not occur. Accordingly, these circuits exhibit a very high processing speed. Tests have shown that speed of response is less than 10 nsec.

Furthermore, the input/output static characteristics of the overall circuits are not affected even if one or several of the input terminals of the circuits are opened. This is very important for constructing a large-scale system.

The PNP and NPN transistors in the above-described circuits can be substituted by p-channel and n-channel MOSFETs, respectively.

The foregoing facts apply not only to the aforementioned MIN and MAX circuits but also to all of the circuits mentioned hereinbelow.

(2) Classes of MIN and MAX circuits

Expanded forms of MIN and MAX circuits will now be considered, and these will be classified into several forms for the sake of describing circuits that construct a fuzzy inference engine.

Figure 3A:
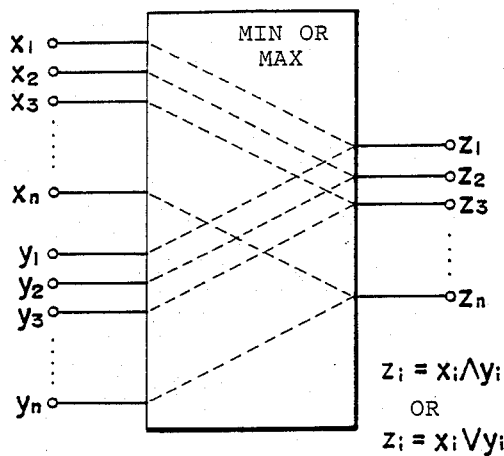

In order to consider solely the two inputs $x_1$, $x_2$ in the MIN circuit of FIG. 1, the transistors $Q_{13}-Q_{1n}$ for the other inputs will be deleted. In addition, the inputs $x_1$, $x_2$ will be replaced by x, y. By so doing, the MIN circuit of FIG. 1 is rendered into a 2-input, 1-output MIN circuit which performs the operation $z=x \cap y$. If n-number of these 2-input, 1-output MIN circuits are prepared, the result is a 2n-input ($x_1$, $x_2$, ..., $x_n$, $y_1$, $y_2$, ..., $y_n$), n-output ($z_1$, $z_2$, ..., $z_n$) MIN circuit, as shown in FIG. 3a. In this circuit, one output $z_i$ is obtained as $z_i=x_i \cap y_i$ depending upon the corresponding inputs $x_i$, $y_i$. Accordingly, this type of MIN circuit shall be referred to as a "corresponding MIN circuit" (abbreviated to "C-MIN"). Likewise, a 2n-input, n-output MAX circuit for performing a MAX operation $z_i=x_i \cap y_i$ (i=1-n) shall be referred to as a "corresponding MAX circuit" (abbreviated to "C-MAX").

Figure 3B:
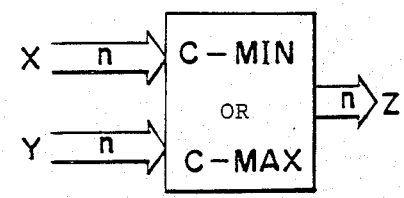

C-MIN, C-MAX can be symbolized as shown in FIG. 3b. The bold arrows which resemble the well-known symbols for bus lines represent n-number of signal lines. The character "n" written inside the arrows indicates the number of signal lines. Each of the n values of the membership functions X, Y is represented as a voltage distributed on each signal line. Therefore, it can be said that C-MIN, C-MAX are circuits for respectively executing the MIN and MAX operations of the two membership functions X, Y. Voltages representing n values of a membership function Z produced as a result of executing the operation also appear as distribution on n signal lines.

Figure 4A:
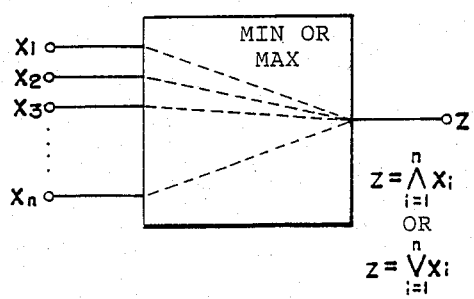
Figure 4B:
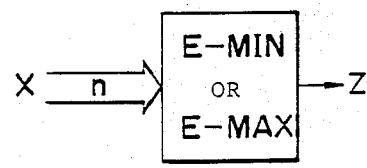

In contrast to the above-described C-MIN and C-MAX circuits, the n-input, 1-output MIN and MAX circuits shown in FIGS. 1a or 1b and 2 output the results of an ensemble operation performed on n input signals and for this reason shall be referred to as an "ensemble MIN circuit" and an "ensemble MAX circuit" (abbreviated to "E-MIN" and "E-MAX", respectively). These circuits are illustrated in simplified form in FIG. 4a and are symbolized as shown in FIG. 4b.

One more special MIN circuit will now be proposed. This is a cartesian product (or direct product) MIN circuit (referred to as a "cartesian product MIN circuit" or "CP-MIN") which executes the above-described "fuzzy relation from A to B". In the present embodiment, as indicated by Eq. (1), the MIN operation rule is employed as the operation which represents the fuzzy relation.

This CP-MIN is a circuit to which the inputs are
$A = (a_1, a_2, \ldots, a_i, \ldots, a_m)$
$B = (b_1, b_2, \ldots, b_j, \ldots, b_n)$
and which outputs the fuzzy relation $$R = [r_1, r_2, \ldots, r_j, \ldots, r_n]$$

$$r_j = \begin{bmatrix} r_{1j} \\ r_{2j} \\ \cdot \\ \cdot \\ \cdot \\ r_{ij} \\ \cdot \\ \cdot \\ \cdot \\ r_{mj} \end{bmatrix}$$

$r_{ij} = a_i \wedge b_j$

Figure 5A:
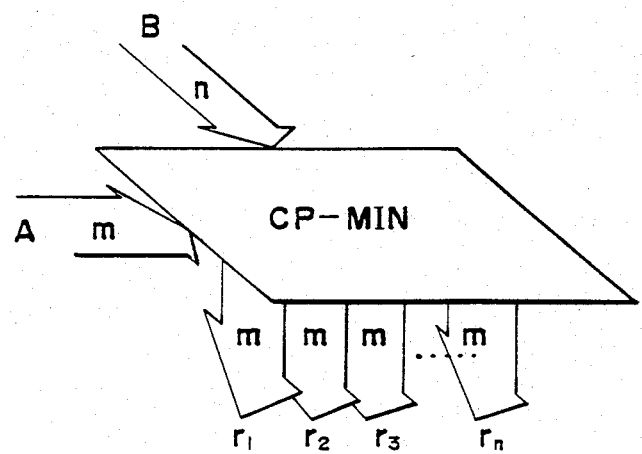
Figure 5B:
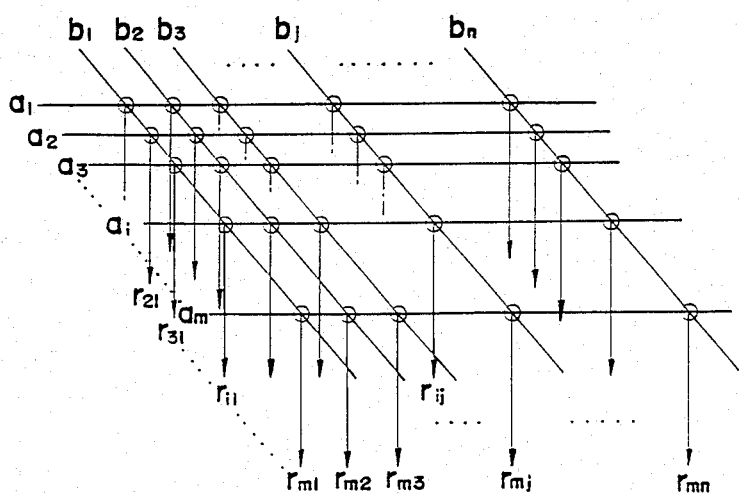
Figure 6:
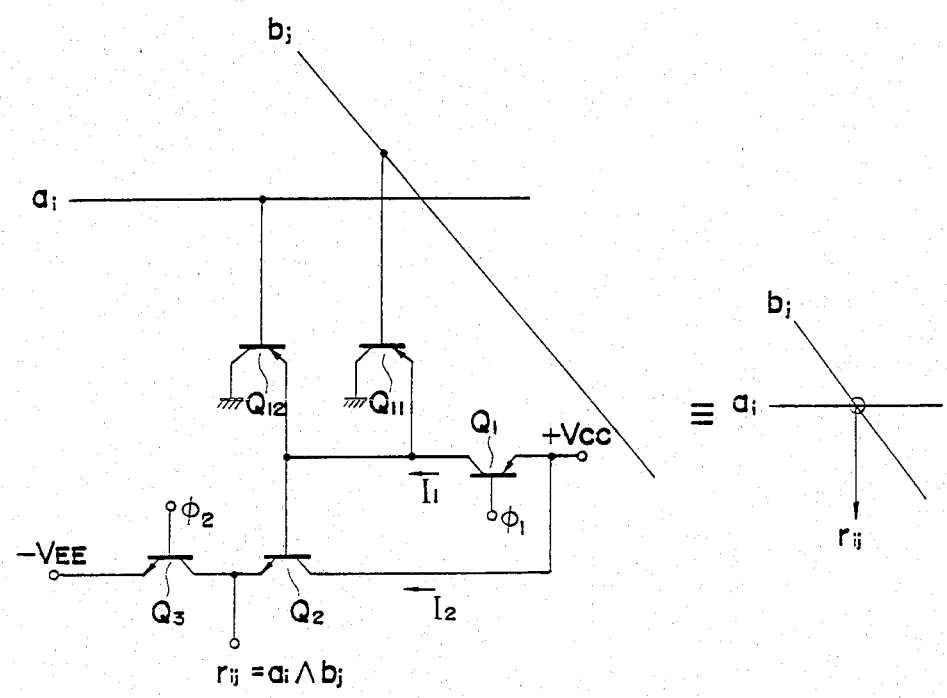

The symbol of the CP-MIN is as shown in FIG. 5a, and the simplified circuit is as depicted in FIG. 5b. FIG. 6 illustrates a concrete example of a circuit symbolized as the intersections of lines $a_i$, $b_j$ and $r_{ij}$ in FIG. 5b. The circuit of FIG. 6 is a MIN circuit modified to have two inputs by deleting the transistors $Q_{13} - Q_{1n}$ of the MIN circuit in FIG. 1a. In FIG. 6, elements corresponding to those shown in FIG. 1a are designated by like reference characters.

(3) Truncation circuits

Figure 7:
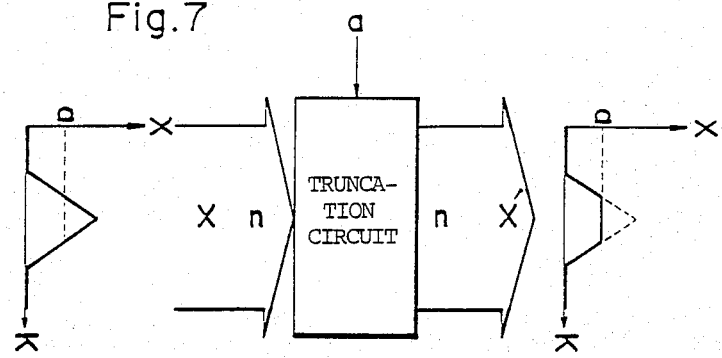
FIG. 7 illustrates the concept of a truncation circuit.

As shown in FIG. 7, a truncation circuit cuts off an inputted membership function X at a certain value a and outputs a membership function X' obtained as a result of the cut-off operation. As will be illustrated later, this circuit is used to construct a fuzzy inference engine using MIN and MAX operations. The truncation circuit has n inputs, the single truncating input a, and n outputs.

Figure 8:
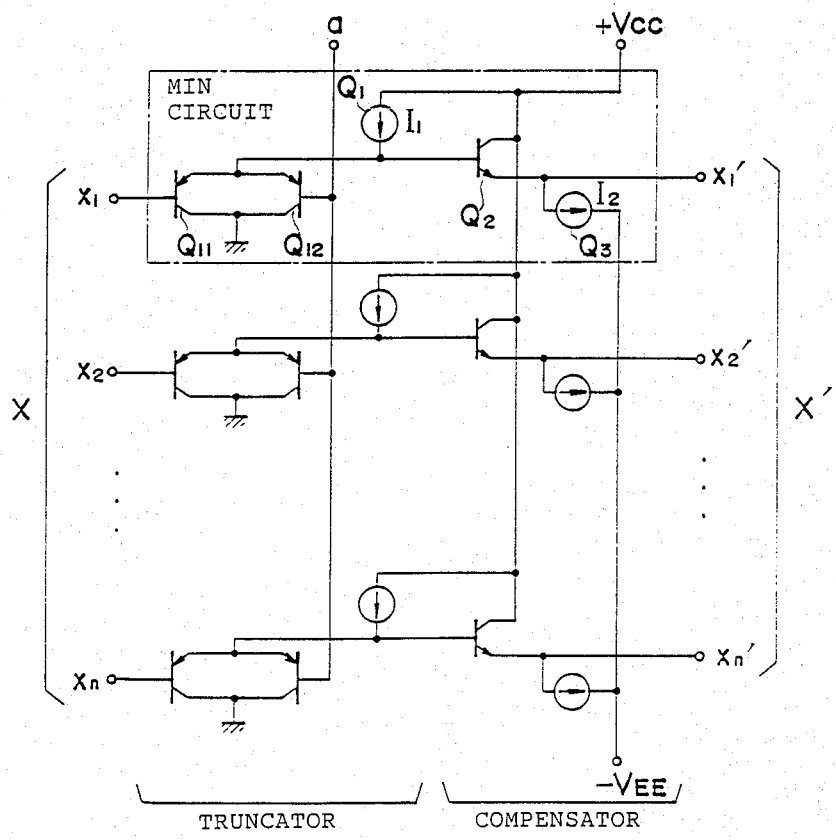
FIG. 8 is a circuit diagram showing a concrete example of a truncation circuit.

A specific example of a truncation circuit is depicted in FIG. 8. The n inputs representing the fuzzy membership function X are $x_1, x_2, \ldots, x_n$, and the truncated output fuzzy membership function X' is represented by $x_1', x_2', \ldots, x_n'$. It can be said that this circuit is obtained by providing n-number of 2-input, 1-output MIN circuits (i.e. C-MINs) in parallel and connecting one input of each MIN to the corresponding inputs of the other MINs to form the truncating input a. The circuit can also be said to comprise a truncator and a compensator.

(4) MIN-MAX circuits, MAX-MIN circuits

Figure 9A:
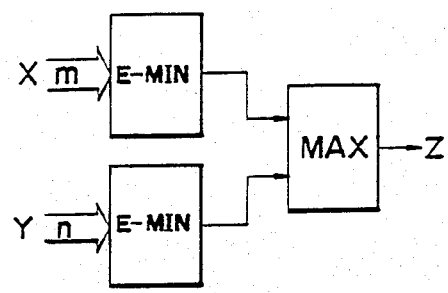
FIGS. 9a and 9b are block diagrams illustrating MIN circuits and MAX circuits connected in cascade, respectively.
Figure 9B:
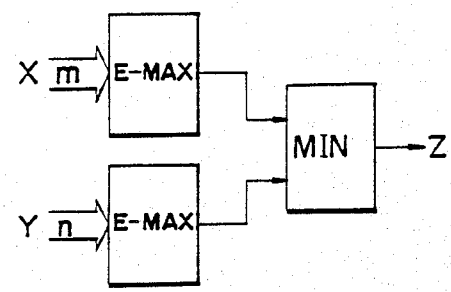

A cascade connection of a MIN circuit and a MAX circuit is often used in order to construct a fuzzy inference engine, described later. FIGS. 9a, 9b, illustrate examples of such a cascade connection. In FIG. 9a, the output sides of an m-input E-MIN and an n-input E-MIN are connected to the input side of a 2-input MAX circuit. FIG. 9b illustrates a circuit obtained by connecting a 2-input MIN circuit to the last stages of an m-input E-MAX and n-input E-MAX. Examples of cascade connections between a MIN circuit and MAX circuit are not limited to these. Other examples which can be conceived of include a cascade connection between a C-MIN and E-MAX, a connection among a plurality of E-MINs provided in parallel and an E-MAX, etc.

Figure 10:
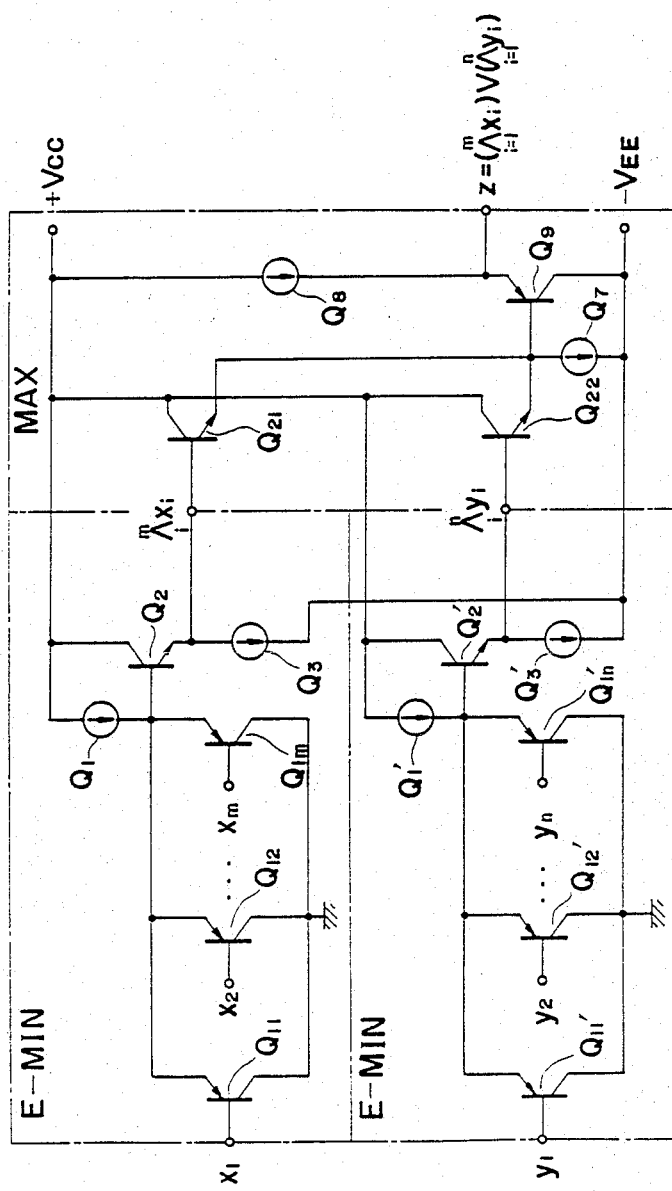
FIG. 10 is a circuit diagram illustrating a concrete example of the circuit of FIG. 9a and FIG. 11 is a circuit diagram illustrating a circuit from which compensators in the circuit of FIG. 10 have been omitted.

A concrete example of the circuit shown in FIG. 9a obtained by utilizing the specific MIN and MAX circuits shown in FIGS. 1a and 2 is illustrated in FIG. 10. The characters shown in FIGS. 1a and 2 are adopted as the characters of the elements constituting one E-MIN and the MAX circuit. However, the character $Q_{1m}$ is assigned to the transistor $Q_{1n}$. The characters indicating the corresponding elements of the other E-MIN have the prime symbol " ' " assigned thereto. The transistor corresponding to the transistor $Q_{1m}$ is assigned the character $Q_{1n}'$.

The compensator (transistor $Q_2$) of the E-MIN shown in FIG. 10 compensates for a positive voltage shift at the emitter junction of the comparator, as mentioned above. The compensator (transistor $Q_9$) in the 2-input MAX circuit compensates for a negative voltage shift at the emitter junction of the comparator in the preceding stage. Since the compensator of the E-MIN and the compensator of the MAX circuit compensate for voltage shifts in mutually opposing directions, the value of the final output z will not change even if these compensators are omitted.

Figure 11:
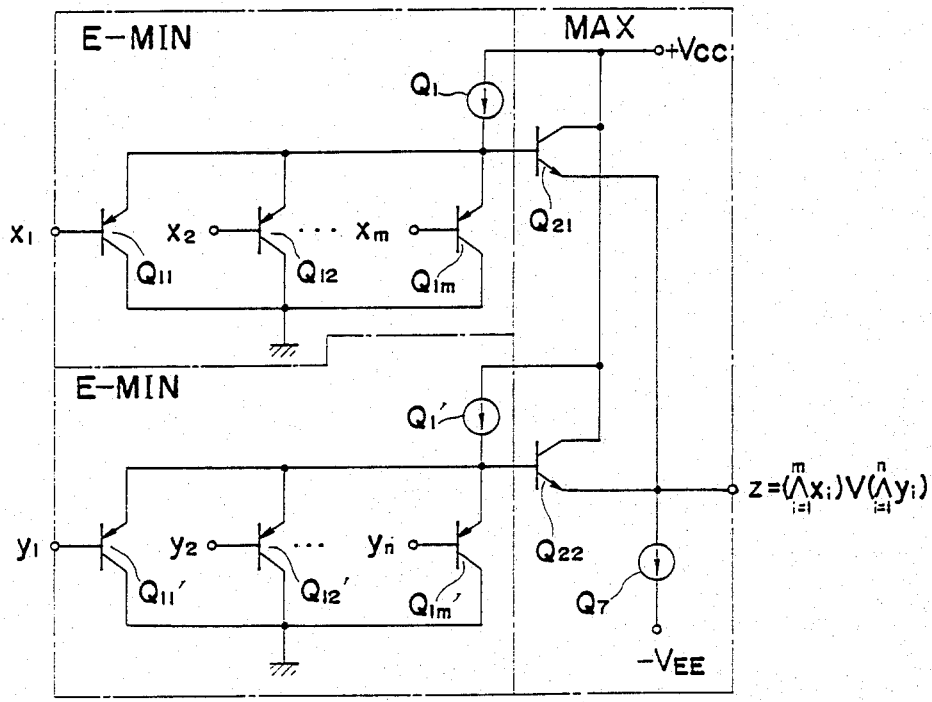

FIG. 11 illustrates a circuit which results by deleting the two compensators in accordance with the above approach. It will be appreciated that the circuit of FIG. 11 is much simpler in comparison with that of FIG. 10. Thus, transistors can be conserved, a higher operating speed can be attained and power consumption can be reduced. It goes without saying that this technique of omitting the compensators can be used effectively in a cascade connection between a MAX circuit and MIN circuit or in a cascade connection between a truncation circuit and MAX circuit.

(5) Controlled MIN-MAX circuits

Figure 12:
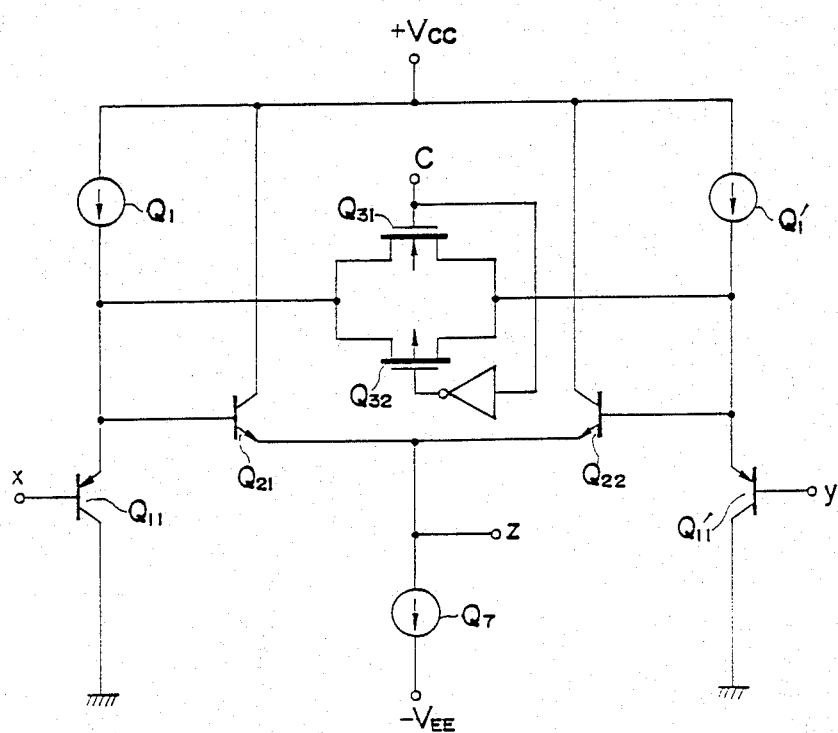
FIG. 12 is a circuit diagram illustrating a controlled MIN-MAX circuit.

A controlled MIN-MAX circuit acts as a MIN circuit or MAX circuit, depending upon the control input. An example is shown in FIG. 12. The circuit possesses two signal inputs x, y, one control input c and one output z.

The circuit illustrated in FIG. 12 is obtained by deleting the transistors $Q_{12} - Q_{1m}$, $Q_{12}' - Q_{1n}'$ in the E-MIN of the MIN-MAX circuit shown in FIG. 11. The signal inputs x, y are applied to the bases of transistors $Q_{11}, Q_{11}'$. An analog switch controlled by the control input c is connected between the emitters of the transistors $Q_{11}, Q_{11}'$. The analog switch comprises an n-channel MOSFET $Q_{31}$ and a p-channel MOSFET $Q_{32}$ connected in parallel. The control input c is connected to the gate of the FET $Q_{31}$ directly and to the gate of the FET $Q_{32}$ upon being inverted by an inverter.

The control input c is a binary signal, namely a signal which takes on an H level (e.g. 5 V) and an L level (e.g. 0 V). If the control input c is at the L level, the analog switch is turned off. In this case, the circuit 12 is precisely the same as a circuit that would be obtained by eliminating the transistors $Q_{12}-Q_{1m}$, $Q_{12}'-Q_{1n}'$ from the circuit of FIG. 11. Therefore, an output equivalent to z=(x) y)=x y is obtained and the circuit acts as a MAX circuit. (Though x, y are equal to x, y and are meaningless as operations, they are expressed in this fashion as far as an analogy with respect to FIG. 11 is concerned.) If the control input c is at the H level, the analog switch is turned on so that the transistors $Q_{11}'$, $Q_{11}'$ act as comparators and one of the transistors $Q_{21}$, $Q_{22}$ acts as a compensator. Accordingly, the circuit functions as a MIN circuit [compare this with the circuit shown in FIG. 1a]. Since the two current sources $Q_1$, $Q_1'$ are present in this case, addition currents from the two current sources $Q_1$, $Q_1'$ flow into whichever of the transistors $Q_{11}$, $Q_{11}'$ is in the conductive state. In consequence, a voltage shift at the emitter junction of the transistor rendered conductive will increase slightly and the compensation performed by the compensator will develop some error. However, the error poses almost no problem in practical use. The reason for this is that the $V_{EB}-I_E$ characteristic of the transistor has an extremely steep leading edge. Experiments have shown that $V_{EB}$ is 0.71 V for an emitter current of 5 mA and 0.725 V for an emitter current of 10 mA. Accordingly, even if the emitter current $I_E$ should double, the difference that will appear in $V_{EB}$ will be only 0.015 V. If the signal input x or y varies over the range 0-5 V (corresponding to fuzzy truth values of 0-1), the value of 0.015 V is entirely negligible.

3. Fuzzy inference engines

(1) Basic inference engines

Discussed next will be a fuzzy inference engine, which is a unit for implementing the above-described modus ponens fuzzy inference. Described first will be a basic inference engine which implements a simple inference, namely one in which the antecedent of the implication includes only one fuzzy proposition (the aforementioned "if x is A", i.e. "x =A"). This will be followed by a discussion of an expanded fuzzy inference engine for implementing more complicated inferences.

Figure 13:
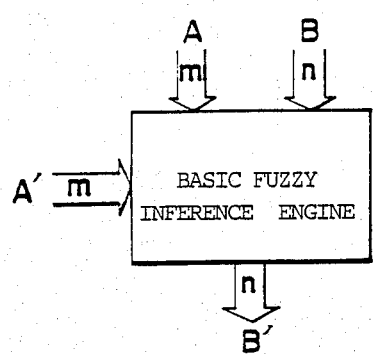
FIG. 13 illustrates the concept of a basic fuzzy inference engine.

The concept of a basic fuzzy inference engine for implementing simple inferences is shown in FIG. 13. The inputs to this inference engine are fuzzy membership functions A, B and A' corresponding to fuzzy propositions given on the basis of the aforementioned fuzzy inference compositional rule. The inference engine outputs a fuzzy membership function B' representing the conclusion. These fuzzy member functions A, B, A' and B' are implemented by analog voltages distributed on m or n signal lines which correspond to the elements of the fuzzy sets.

A basic fuzzy inference engine is a circuit which executes the operation of Eq. (2), (3) or (4) set forth above. Since at least three types of fuzzy inference engine arrangements can be considered to correspond to the Eqs. (2), (3) and (4), these will be referred to as Type I, Type II and Type III.

(2) Type I

Figure 14:
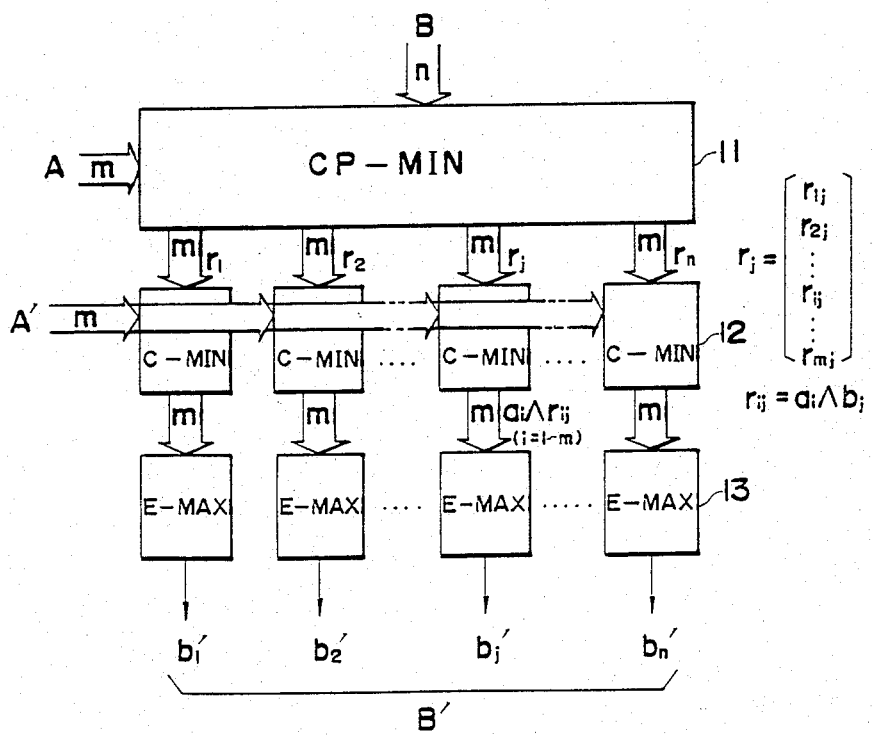
FIG. 14 is a block diagram illustrating a fuzzy inference engine of Type I.

A basic fuzzy inference engine of Type I executes the operation of Eq. (2). A block diagram thereof is shown in FIG. 14. A voltage input representing the fuzzy membership function A and distributed on m signal lines, and a voltage input representing the fuzzy membership function B and distributed on n signal lines are applied to a CP-MIN 11, where (n×m) output voltage signals ($r_j$, j=1−n) representing a fuzzy relation R from A to B are obtained. Also provided are n C-MINs 12 to each one of which are applied signals (a set of m voltage signals) representing the fuzzy membership function A', and a signal $r_j$ ($r_j$ comprises n voltage signals) representing the results of the abovementioned CP-MIN operations. The output of each C-MIN 12 comprises m voltage signals representing $a_i$ $r_{ij}$ (i=1−n). Further provided are n E-MAX circuits 13 each one of which performs a MAX operation on the m voltage signals inputted thereto. Accordingly, it is possible to obtain the fuzzy membership function B' representing a conclusion as a set of analog voltages $b_j'$ distributed on n output signal lines of the n E-MAXs 13.

It is possible to delete the compensators in the cascade connection between the C-MINs 12 and E-MAXs 13, as described earlier.

(3) Type II

Figure 15:
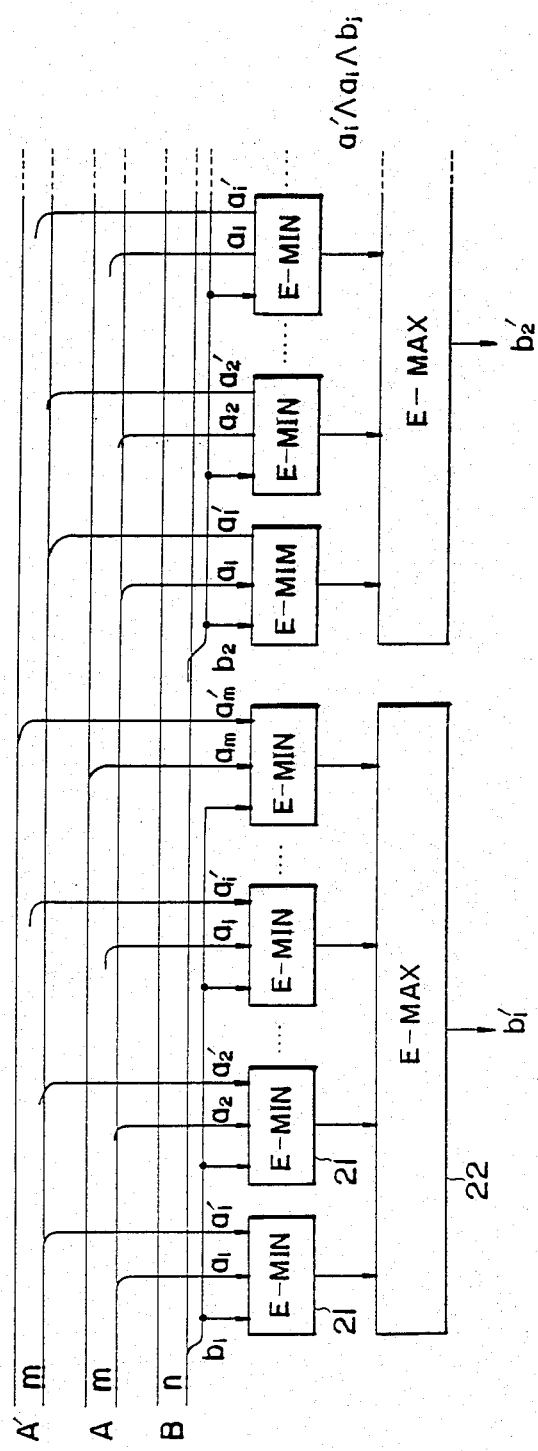
FIG. 15 is a block diagram illustrating a portion of the construction of a fuzzy inference engine of Type II.

A basic fuzzy inference engine of Type II executes the operation of Eq. (3). A partial block diagram thereof is shown in FIG. 15. It is necessary to execute the operation $a_i'$ $b_j$ (i=1−m) for all j's (j=1−n). Consequently, m E-MINs 21 are provided for each value of j, and $b_j$, $a_i'$ and $a_i$ (i=1−m) voltage signals are inputted to each E-MIN 21. A total of n x m E-MINs are required. For each value of j, m outputs of the m E-MINs 21 are delivered to an E-MAX 22. The E-MAX circuits 22 provided are n in number, and an output voltage $b_j'$ (j=1−n) is obtained from each E-MAX 22.

The compensators can be deleted in the cascade connection between the E-MINs 21 and E-MAXs 22 in this circuit.

Figure 16:
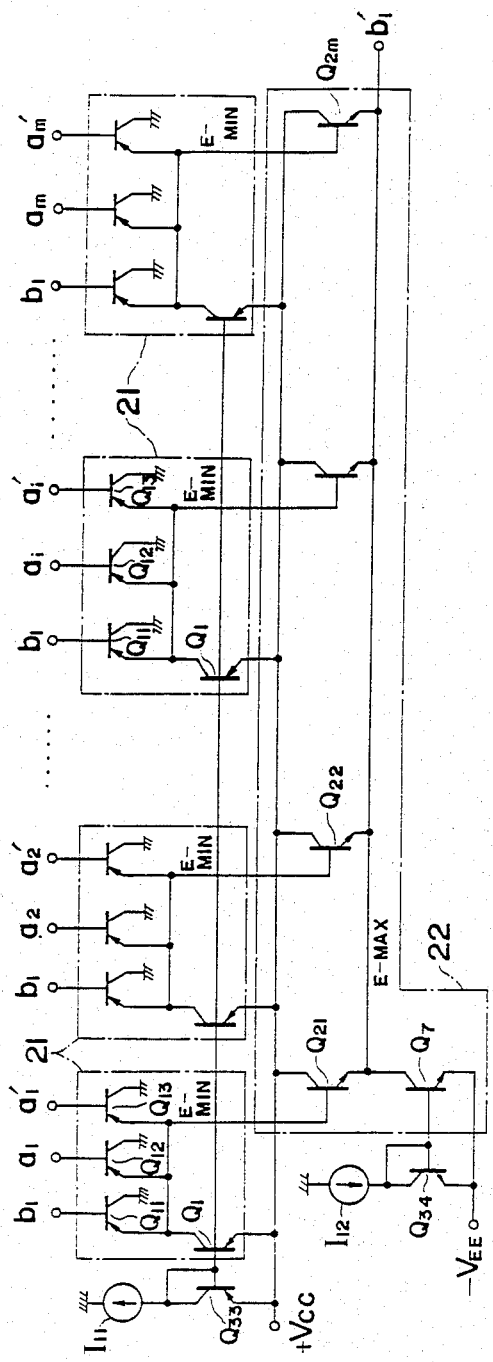
FIG. 16 is a circuit diagram illustrating a concrete circuit corresponding thereto.

FIG. 16 illustrates a detailed circuit construction of part of the block diagram of FIG. 15 for obtaining one $b_j$ (specifically, $b_1'$) In the E-MINs 21 and E-MAX 22, elements similar to those shown in FIGS. 1a and 2 are designated by like reference characters and the construction thereof therefore can be readily understood. A multi-output current mirror is constructed by the transistors $Q_1$ acting as current sources in E-MINs 21, and a newly provided transistor $Q_{33}$. The transistor $Q_{33}$ is driven by current source $I_{11}$. Accordingly, all of the E-MINs 21 are driven by equal currents through a simple construction. In a similar manner, the transistor $Q_7$ serving as the current source in E-MAX 22 constructs a current mirror with a newly provided transistor $Q_{34}$ and is driven by current source $I_{12}$.

(4) Type III

Figure 17:
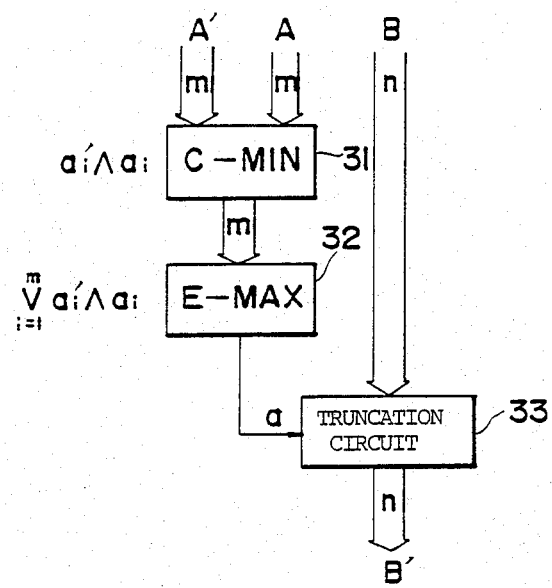
FIG. 17 is a block diagram illustrating the construction of a fuzzy inference engine of Type III.

A basic fuzzy inference engine of Type III executes the operation of Eq. (4). A block diagram thereof is shown in FIG. 17. Voltages representing the fuzzy membership functions A, A' and each distributed on m signal lines are applied to a C-MIN 31, where the MIN operation $a_i'$ $a_i$ (i=1−m) is performed. The C-MIN 31 produces m output voltages which are inputted to an E-MAX 32. The output of the E-MAX 32 represents $$\prod_{i=1}^{m} a_i' \quad a_i$$

and is applied to a truncation circuit 33 as a truncating input a. A voltage ($b_j$, j=1−n) representing the membership function B and distributed on n signal lines is inputted to the truncation circuit 33. Ultimately, the truncation circuit 33 performs the operation of Eq. (4) so that the conclusion B' can be obtained as a set of analog voltages $B_j'$ distributed on n output lines.

Figure 18:
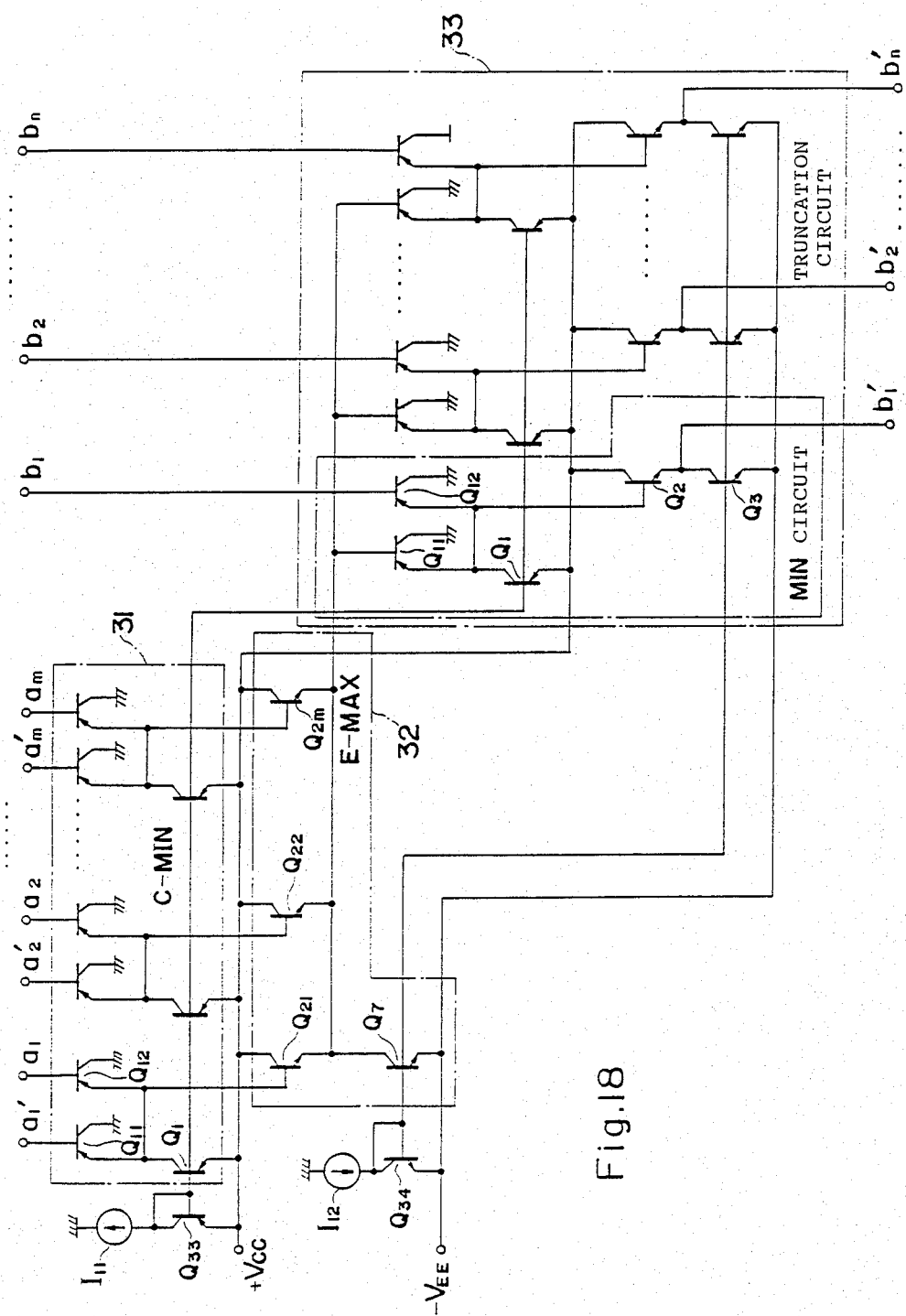
FIG. 18 is a circuit diagram illustrating a concrete circuit corresponding thereto.

A concrete electronic circuit of the fuzzy inference engine of Type III is illustrated in FIG. 18. Elements corresponding to those shown in FIGS. 1a, 2, 8 and 16 are designated by like reference characters. Compensators are deleted from the cascade connection between the C-MIN 31 and E-MAX 32. The truncation circuit 33 is exactly the same as that shown in FIG. 8. The transistors $Q_1$, which serve as the m current sources of the C-MIN 31, together with the transistors $Q_1$ of truncation circuit 33 and the transistor $Q_{33}$, constructs a multi-output current mirror. The transistor $Q_7$ serving as the current source in the E-MAX 32, together with the transistors $Q_3$ of truncation circuit 33 and a transistor $Q_{34}$, constructs a multi-output current mirror.

The inference engine of Type III is much simpler in construction than the inference engines of Types I and II. The inference engine of Type III will consist of (4m+5n+1)-number of transistors except for transistors $Q_{33}$, $Q_{34}$ In an experiment using discrete bipolar transistors and not a monolithic integrated circuit, an operation speed of 100 nsec ($10^{-7}$ sec) was obtained. This means that this basic inference engine is capable of actually implementing 10,000,000 fuzzy inferences per second (i.e. 10 megaFIPS, where "FIPS" refers to fuzzy inferences per second).

(5) Expanded inference engines

There are times when an inference in which the antecedent of an implication includes two fuzzy propositions becomes necessary, as will be described next. This is referred to as an "expanded fuzzy inference". The antecedents of an implication are connected by "and-/or". Either "and" or "or" is selected.

| Implication: | If x is A and/or y is B, then z is C |
|---|---|
| Premise: | x is A' and/or y is B' |
| Conclusion: | z is C' |

This is expressed by symbols as follows:

| Implication: | x = A and/or y = B→z = C |
|---|---|
| Premise: | x = A' and/or y = B' |
| Conclusion: | z = C' |

Figure 19:
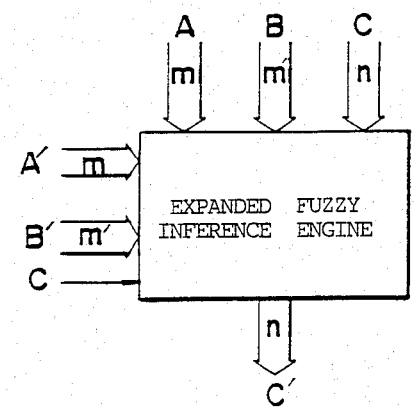
FIG. 19 illustrates the concept of an expanded fuzzy inference engine.

This expanded fuzzy inference is implimented by an expanded fuzzy inference engine. The concept of an expanded inference engine is illustrated in FIG. 19. The inputs are fuzzy membership functions A, B, C, A' and B', as well as a conjunction selection c for selecting the conjunction "and/or". The output is a fuzzy membership function C' representing the conclusion. The fuzzy membership functions A, A' are represented by respective voltages distributed on m signal lines each, the fuzzy membership functions B, B' are represented by respective voltages distributed on m' signal lines each, and the fuzzy membership functions C is represented by a voltage distributed on n signal lines.

Figure 20:
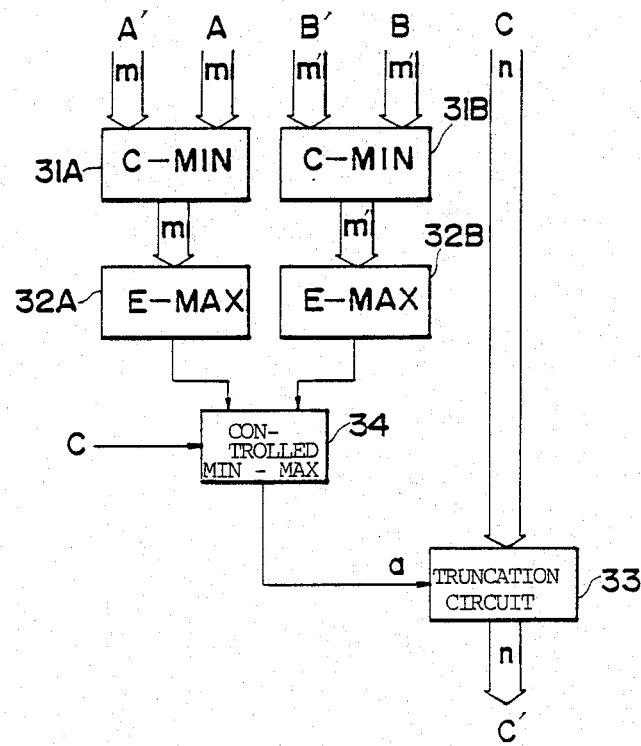
FIG. 20 is a block diagram illustrating an example of the construction thereof.

FIG. 20 illustrates the construction of an expanded inference engine. This is obtained by revising somewhat the construction of the basic inference engine of Type III shown in FIG. 17. A C-MIN operation (C-MIN 31A) is performed between the membership functions A and A', and an E-MAX operation (E-MAX 32A) on m voltages representing the results of the C-MIN operation is executed. C-MIN and E-MAX operations (C-MIN 31B, E-MAX 32B) are also performed with regard to the fuzzy membership functions B, B'. In the present embodiment, the conjunction "and" is realized by a MIN operation, and the conjuction "or" is realized by a MAX operation. The above-described controlled MIN-MAX circuit 34 is used in such a manner that the conjunction operation and the selection of the conjuction can readily be performed. The results of the two E-MAX operations are inputted to the controlled MIN-MAX circuit 34. A conjunction selection input signal c for selecting "and" or "or" is applied as the control input of the controlled MIN-MAX circuit 34. The membership function C is applied to the truncation circuit 33, and the output a of the controlled MIN-MAX circuit 34 is applied to the truncation circuit 33 as the truncating signal. A voltage distribution of a fuzzy membership function representing the conclusion C' is obtained from the truncation circuit 33.

4. Fuzzy memories (1) Concept of a fuzzy memory

The function of a fuzzy memory is to store fuzzy membership functions and to output a designated fuzzy membership function as a voltage distribution on a plurality of signal lines.

Figure 21:
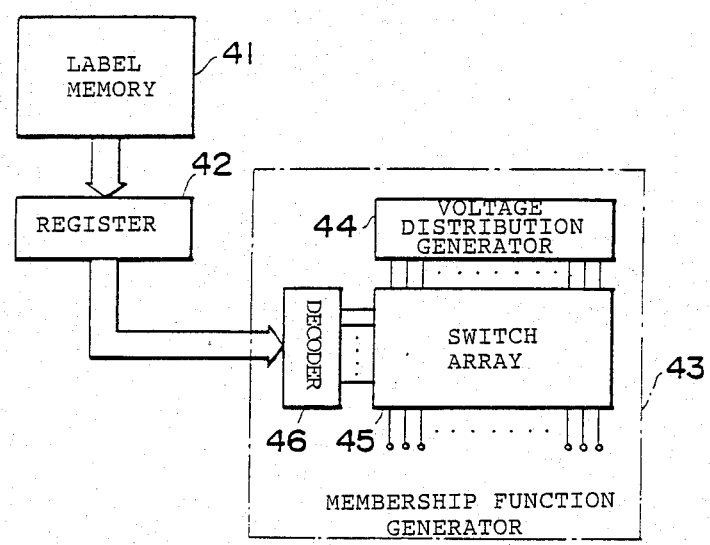
FIG. 21 is a block diagram showing the basic construction of a fuzzy memory.

The basic concept of a fuzzy memory which stores a plurality of fuzzy membership functions and from which these functions are read out is illustrated in FIG. 21. A fuzzy memory is composed of a label memory 41 storing the labels of fuzzy membership functions, a register 42 storing codes representing labels read out of the label memory 41, and a membership function generator circuit 43 which, by fuzzifying a label, outputs a voltage distribution corresponding to the label. A label may be thought of as being a word representing a fuzzy membership function. The label memory 41 and register 42 are binary devices. The label memory 41 is e.g. a binary RAM.

The membership function generator circuit 43 is constituted by a voltage distribution generator circuit 44 for generating a predetermined voltage distribution on a plurality of signal lines, a switch array 45 for sending the generated voltage distribution out on predetermined output signal lines, and a decoder 46 for controlling the switches of the switch array 45 by decoding a code representing a label read out of the label memory 41. Though the shape of the voltage distribution generated by the voltage distribution generator circuit 44 is predetermined, the position of the voltage distribution on the output signal lines is changed by the switch array 45 controlled by the output of the decoder 46. Accordingly, a voltage distribution representing a fuzzy membership function corresponding to the label read out of the label memory 41 appears on the output lines.

The fuzzy memory stores the labels of fuzzy membership functions and not the grades (the individual function values) of fuzzy membership functions converted into a number of binary codes. This means that the binary memory (memory 41) need have only a small capacity. For example, if the number of types of fuzzy membership functions to be stored is less than eight, then the labels thereof may be expressed by 3-bit codes and, hence, one fuzzy membership function can be stored in the form of three bits. Futhermore, since the access time of an ordinary binary memory is much shorter in comparison with an anolog memory, high-speed read-out is possible. Moreover, a fuzzy membership function expressed by an analog voltage distribution eventually can be obtained. Since data are stored in the form of binary codes, the memory is strongly noise-resistant.

Concrete examples of some fuzzy membership function generator circuits are described hereinbelow. Seven types of fuzzy membership functions are generated herein. The labels of these membership functions shall be NL, NM, NS, ZR, PS, PM and PL. These express the following items of linguistic information: negative large, negative medium, negative small, zero, positive small, positive medium and positive large. Further, the number of points (corresponding to the number of elements of a fuzzy set) in the region of the variables of a fuzzy membership function shall be limited to 25. Accordingly, the output terminals of the fuzzy membership function generator circuit are 25 in number.

(2) Fuzzy membership function generator circuit using a switch matrix

FIGS. 22 and 23 illustrate an example of a fuzzy membership function generator circuit using a switch matrix as the switch array. In FIG. 22, the fuzzy membership function generator circuit has output terminals numbered from 0 to 24, and the seven types of fuzzy membership functions outputted by these output terminals are shown below them.

The values of the outputted fuzzy membership functions are quantized at four levels for the sake of simplicity. For example, these four levels correspond to voltages of 0, 1.7, 3.3 and 5.0 V. These four levels are decided by a voltage distribution generator circuit 44A. The latter is provided with three fuzzy truth value voltage sorces 44a, 44b and 44c for the three voltages 1.7, 3.3 and 5.0, respectively. Five voltage lines VL indicated by the slanting lines in FIG. 22 extend from the circuit 44A. The centrally located voltage line is connected to the voltage source 44c, the voltage lines located both sides thereof are connected to the voltage source 44b, and the two outermost voltage lines are connected to the voltage source 44a.

A decoder 46A is a 1-of-8 decoder. A 3-bit ($c_1$, $c_2$, $c_3$) binary signal representing a label provided by the register 42 is inputted to the decoder 46A. The decoder 46A outputs an H-level signal on whichever of the eight output terminals is decided by the code indicated by the binary signal. The eight output terminals correspond to "undecided" and the seven types of labels. For example, the H-level signal is outputted at the "undecided" terminal when the input code signal is 000 and at the NL output terminal when the input code signal is 001. Signal lines SL indicated by the horizontal lines in FIG. 22 extend from these output terminals with the exception of the "undecided" output terminal.

Output lines OL are led out to the 25 output terminals from predetermined intersections of the voltage lines VL and signal lines SL in the switch matrix 45A. As shown in FIG. 23, a symbol 45a indicated by a small square at each of these intersections is a switch, which is constituted by e.g. a MOSFET, provided between the voltage line VL and output line OL and on/off controlled by the voltage on signal line SL. It is of course permissible to provide one output line OL with two or more of the switches 45a. All of the output lines OL are grounded via a resistor 45b on the output terminal side.

When a label of a certain fuzzy membership function is read out of the level memory 41 and applied to the decoder 46A via the register 42 in the above arrangement, an H-level signal appears on whichever of the signal lines SL corresponds to this label and the switches 45a provided on this signal line are turned on (closed). As a result, the voltages from the voltage distribution generator circuit 44A pass through the switches 45a which have turned on and appear at the corresponding output terminals via the output lines OL. Accordingly, a voltage distribution representing the abovementioned fuzzy membership function is outputted.

(3) Fuzzy membership function generator circuit using a pass transistor array

Figure 24:
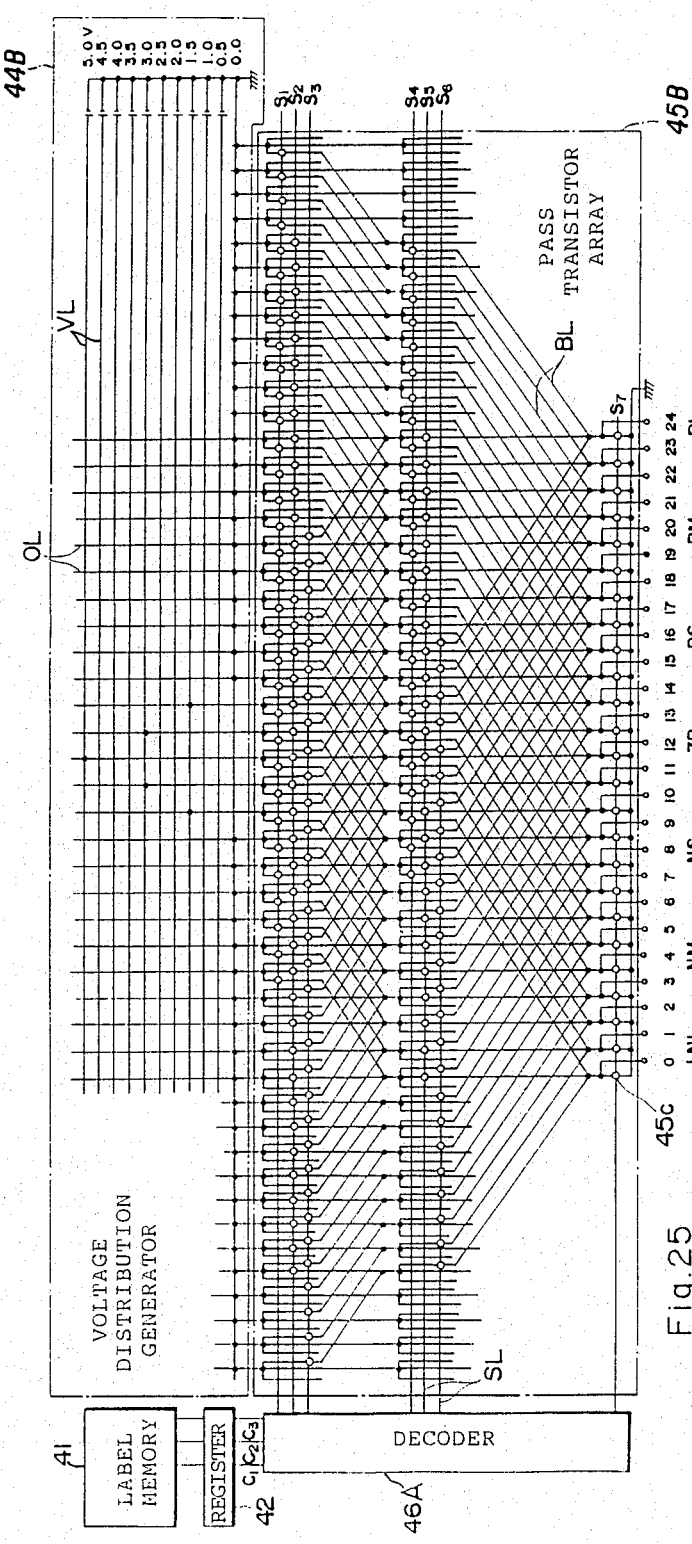
FIG. 24 is a circuit diagram illustrating a fuzzy membership function generator circuit realized by using a pass transistor array.
Figure 25:
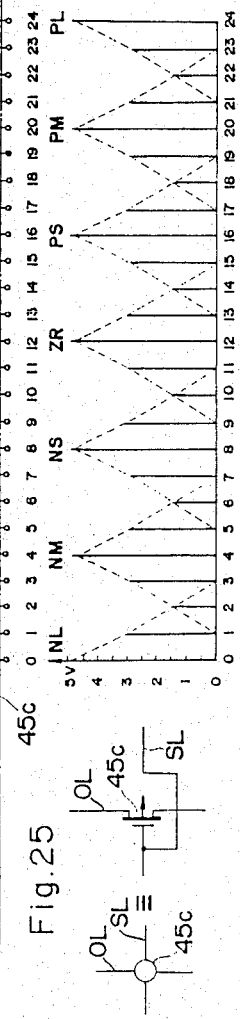
FIG. 25 illustrates, the concrete construction of a symbol used in FIG. 24.

FIGS. 24 and 25 illustrate a fuzzy membership function generator circuit using a pass transistor array 45B as the switch array.

A voltage distributor generator circuit 44B is equipped with ten voltage sources for generating fuzzy truth value voltages 0.0, 0.5, ..., 4.5 and 5.0 V in order to quantize a membership function at 11 levels. These voltage sources correspond to fuzzy truth values of 0, 1/10, ..., 9/10 and 1, respectively. The generator circuit 44B has a PROM in which the values of a membership function having the label ZR are programmed. The PROM has power supply lines VL connected to the abovementioned voltage sources and ground, and output lines OL connected to output termianls via the pars transistor array 45B. The PROM comprises two aluminum layers arranged one on the other. The output lines OL are formed on the first layer and the power supply lines VL on the second layer. These two layers are insulated from each other by an insulative layer consisting of e.g. photosensitive polyimide. The shape of a fuzzy membership function is programmed by forming through-holes at points of intersection of these layers. Since the through-holes can be formed by a mask ROM technique, a membership function having any shape can be programmed. The black circles depicting the nodes of the lines VL and lines OL indicate the through-holes. The lines VL are connected to the lines OL at the points where the through-holes are formed and it is at these points that the fuzzy truth value voltages are transferred to the pass transistor array 45B. It is permissible for the node of two lines VL and OL to be shorted by a field ROM technique, namely by causing insulative breakdown of the desired cross point by application of a high voltage.

The pass transistor array 45B comprises the output lines OL led out from the voltage distribution generator circuit 44B, the signal lines SL connected to the seven terminals of the decoder 46B, slanting lines BL for shifting the voltages at the intersections of the lines OL, SL four or eight digits to the left or right, and switching elements, namely PMOSFETs, 45c provided at respective ones of the intersections of the signal lines SL, and output lines OL and slanting lines BL and controlled by the voltages on the respective signal lines SL. The manner in which the switching elements 45c are connected is illustrated in FIG. 25. The seven signal lines SL connected to the decoder 46B or the rows of switching elements controlled by these lines shall be designated $S_1, S_2, \ldots, S_7$. $S_1-S_7$ will also refer to the signals on these lines SL where appropriate.

The switch row $S_1$ shifts a membership function, which has been programmed in the voltage distribution generator circuit 44B, four digits to the left, the switch rows $S_3$, $S_4$ and $S_6$ shift the membership function four digits to the right, eight digits to the left and eight digits to the right, respectively. The switch rows $S_2$ and $S_5$ are for delivering the programmed membership function directly to the output terminals and do not shift the function to the left or right. The switch array $S_7$ is a grounded switch array. When the switches $S_7$ are on and the other switches $S_1-S_6$ are off, all of the output terminals are dropped to ground level.

Figures 26, 28:
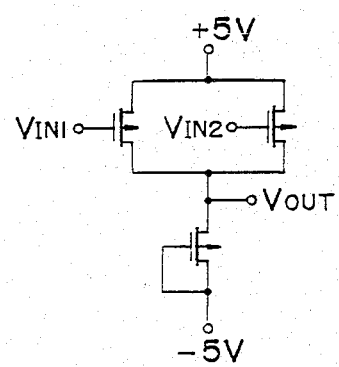
FIG. 26 is a table illustrating the operation of a decoder in FIG. 24.
FIG. 28 is a circuit diagram showing a NAND gate used in the circuit of FIG. 27.
Figure 27:
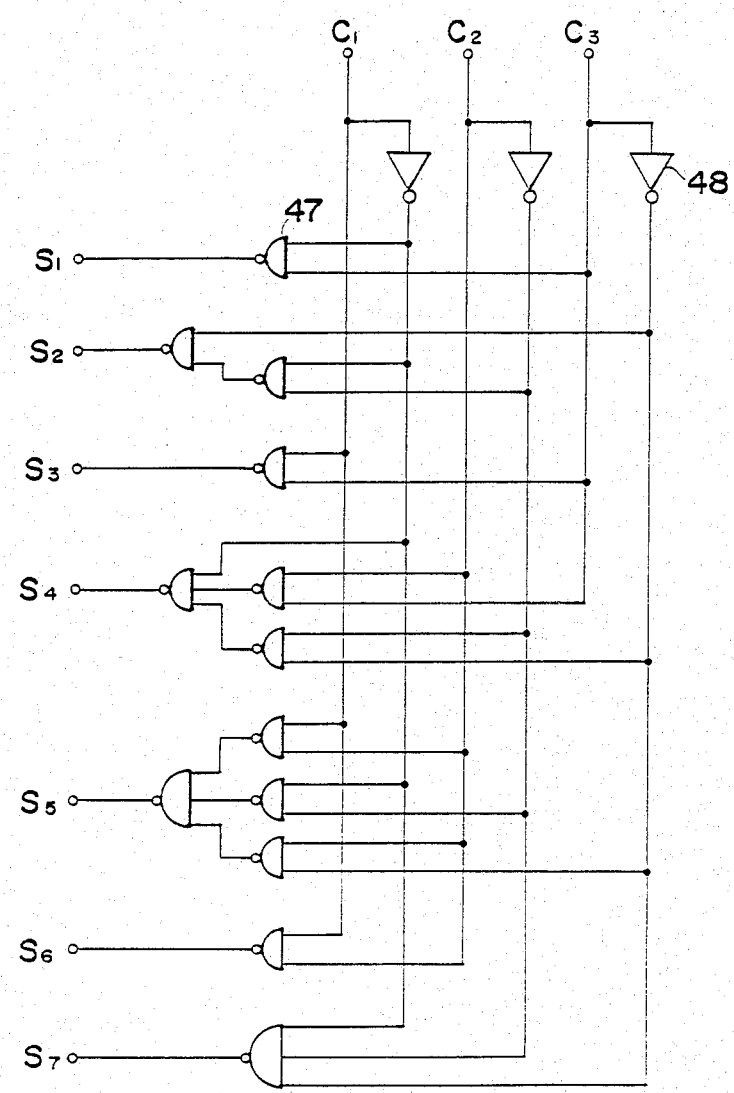
FIG. 27 is a circuit diagram illustrating the concrete construction of the same decoder.

FIG. 26 illustrates the relationship between the labels of fuzzy membership functions and the binary levels of the signals $S_1-S_7$. The decoder 46B converts the 3-bit binary signals $c_1$, $c_2$, $c_3$ (0 V or +5 V) from the register 42 into the 7-bit binary signals $S_1-S_7$ [−5 V (L level) or +5 V (H level)] in accordance with the table shown in FIG. 26. The decoder 46B is composed of a combination of NAND gates 47 and inverters 48, as shown in FIG. 27.

By way of example, the switch rows $S_3$ and $S_6$ turn on if the label outputted by the label memory 41 is PL. The membership function programmed in the voltage distribution generator circuit 44B is shifted four digits to the right through the switch row $S_3$ and is shifted eight digits farther to the right through the switch row $S_6$. As a result, the programmed membership function is shifted 12 digits to the right and the membership function which appears at the output terminals is PL (positive large).

In FIG. 24, 25 centrally located output lines OL are connected to the line VL of the voltage distribution generator circuit 44B that is connected to ground level. Also connected to this line VL are 24 (12×2) lines located on the right and left of the central output lines OL and lying parallel thereto, as well as the slanting lines BL. Switch element rows $S_1$, $S_2$, $S_3$, $S_4$, $S_5$ and $S_6$ are provided at the points where these lines intersect the signal lines SL. This arrangement is for the purpose of assuring that ground-level signals will be outputted to the output terminals regardless of how the programmed membership function is shifted.

The pass transistor array 45B must pass the fuzzy truth values (0−5 V) to the output terminals without attenuation. When a fuzzy truth value voltage is lower than the threshold voltage of a PMOSFET in an ordinary PMOS circuit, the PMOSFET will not attain the fully conductive state if the gate voltage $V_G$ (decoder output) is 0 V. In order for the PMOSFET to be turned on fully, it is required that $V_G$ be made −5 V. To accomplish this, the decoder 46B is adapted to generate outputs which take on values of −5 V (L) and +5 V (H), as mentioned above. FIG. 28 illustrates an example of the NAND gate 47 constituting the decoder of FIG. 27 for generating these output signals $S_1-S_7$.

(4) Selection of fuzzy membership function shape

The fuzzy membership functions illustrated in the foregoing description are chevron or triangular in shape. However, a variety of membership functions are conceivable and it would be desirable to be able to select different shapes depending upon need.

Figure 29:
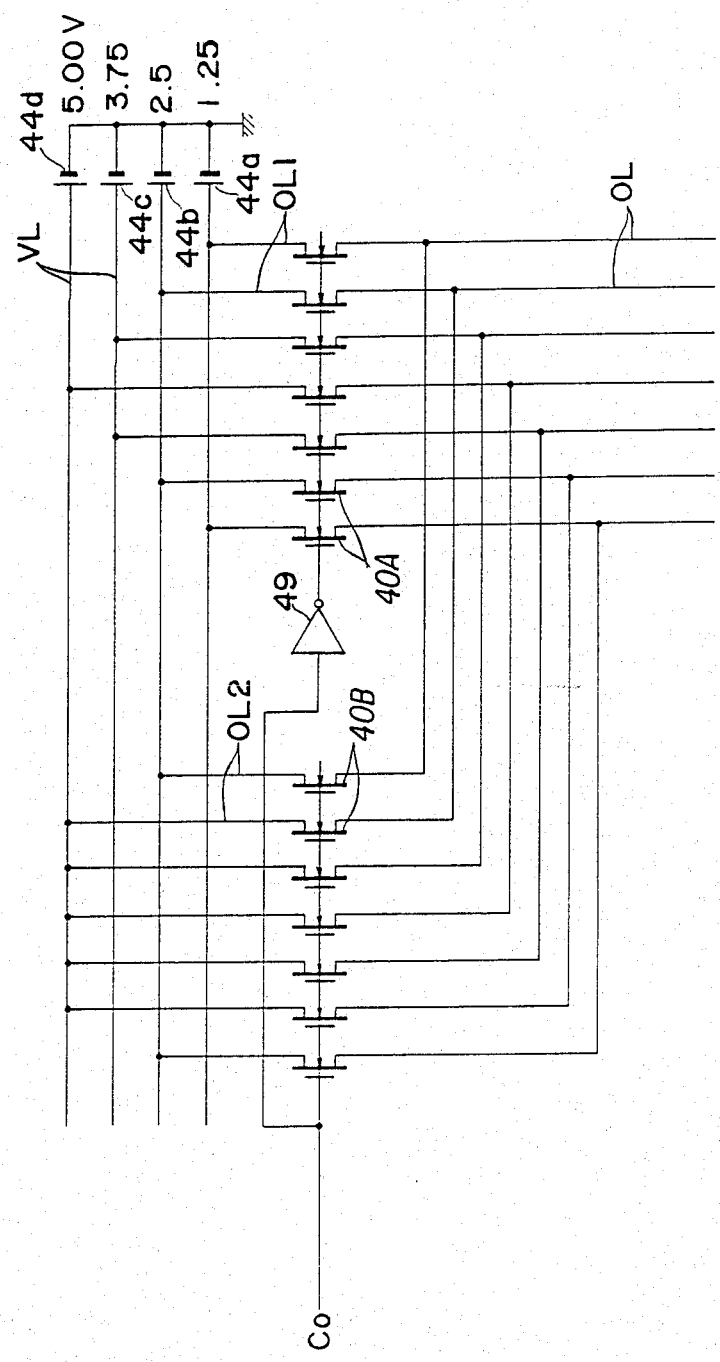
FIG. 29 is a circuit diagram illustrating a voltage distribution generator circuit capable of selecting the shape of a fuzzy membership function.

FIG. 29 illustrates a voltage distribution generator circuit applicable mainly to a fuzzy membership function generator circuit of the type shown in FIG. 22 and adapted to enable selection of the shape of a fuzzy membership function. The output lines VL connected to several voltage sources 44a-44d are provided with output lines OL1 connected so as to output a voltage distribution representing a chevron- or triangle-shaped fuzzy membership function, and output lines OL2 connected so as to output a voltage distribution representing a function having a trapezoidal shape. A switching element or NMOSFET 40A is connected to each line OL1, and a switching element or NMOSFET 40B is connected to each line OL2. The lines OL1, OL2 are connected to the output lines OL, which are connected to the output terminals, on the output sides of these switching elements. The switching elements 40B are directly controlled by a selection signal $c_o$, and the switching elements 40A are controlled by the signal $c_o$ applied via an inverter 49.

When the selection signal $c_o$ is at the L level, the switching elements 40A turn on and voltages representing a chevron- or triangle-shaped fuzzy membership function are outputted on the output lines OL. Conversely, if the signal $c_o$ is at the H level, the elements 40B turn on so that voltages representing a function having a trapezoidal shape are outputted. Thus, it is possible to select the shape of the fuzzy membership function.

In the circuit of FIG. 29, let the threshold value voltage of the FETs 40A, 40B be $V_{TH}$ (usually 1 V). In such case, it will suffice if the L level of the binary selection signal $c_o$ controlling these FETs is less than $V_{TH}$ and the H level is above $V_{TH}+5$ V. Here the value of 5 V is the voltage of the voltage source 44d that generates the largest voltage.

The shapes of the generated voltage distribution in the voltage distribution generator circuit, namely the shapes of the membership functions, are not limited to the aforementioned two shapes. It is possible to adopt an arrangement in which three or more shapes can be prepared in advance and any one thereof can be selected. In addition, it goes without saying that the selection of function shape is applicable to the fuzzy membership function generator circuit shown in FIG. 24.

(5) Expanded form of a membership function generator circuit

Figure 30:
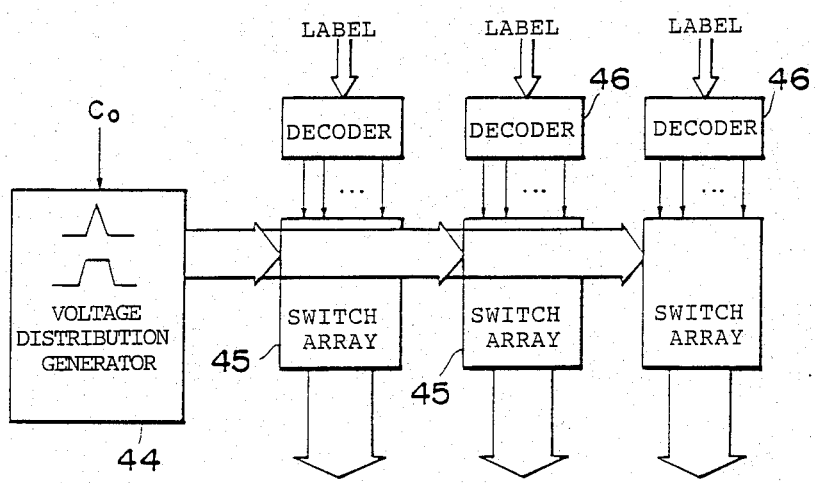
FIG. 30 is a block diagram illustrating an expanded form of a membership function generator circuit.

A voltage distribution generator circuit generates voltage signals distributed on a plurality of lines. Accordingly, it is possible to apply the output voltages of one voltage distribution generator circuit to a plurality of switch arrays. FIG. 30 illustrates a membership function generator circuit which includes one voltage distribution generator circuit 44 and a plurality of switch arrays 45 to which the output voltages of the generator circuit 44 are applied. Each switch array 45 is driven by a respective decoder 46. Code signals of the same or different labels are applied to respective ones of the decoders 46. Accordingly, voltage distributions representing a plurality of the same or different fuzzy membership functions can be obtained from the membership function generator circuit.

5. Fuzzy computers

(1) Concept of a fuzzy computer

FIG. 31 illustrates the concept of a fuzzy computer. This fuzzy computer is capable of implementing fuzzy information processing of the simplest type, or in other words, is applied to cases where one implication exists. The fuzzy computer basically comprises a fuzzy memory 54 and a fuzzy inference engine 50, as mentioned above. Three membership function generator circuits (hereinafter referred to as MFGs) 43 are provided in order to generate voltage distributions representing three fuzzy membership functions A, B and A. Labels read out of a label memory 41 and temporarily stored in registers 42 are applied to the MFGs 43. The three MFGs 43 can be considered to the same as that shown in FIG. 30, or each MFG 43 can be considered to possess its own voltage distribution generator. The fuzzy membership functions A, B, A′ outputted by the fuzzy memory 54 are applied to the basic fuzzy inference engine 0, which has been described earlier with reference to FIGS. 13 through 18. A fuzzy inference result B′ is obtained as distributed analog voltages, namely in the form of a fuzzy output. Depending upon the particular case, as in a fuzzy control system, for example, there are times when it is required to obtain a definite result, namely a non-fuzzy output, from a fuzzy computer. An auxiliary defuzzifier 52 executes such processing and provides a discrete analog voltage (non-fuzzy output).

In the fuzzy computer of FIG. 31 and in all of the fuzzy computers of the types described hereinbelow, the control unit and control bus for synchronizing computer operation are not shown.

All of the fuzzy memories described above store the labels of a plurality of fuzzy membership functions in a binary memory in advance, and in accordance with the label read out of the fuzzy memory, the MFG generates a voltage distribution representing the corresponding fuzzy membership function. However, the fuzzy memory or MFG used in a fuzzy computer is not limited to the type mentioned. It will suffice if the fuzzy memory and MFG are capable of providing the fuzzy inference engine with a voltage distribution representing a predetermined fuzzy membership function. Therefore, by way of example, a number of voltage distribution generator circuits inclusive of a PROM of the kind shown in FIG. 24 can be prepared, and these circuits can be pre-programmed to have different or the same fuzzy membership functions. Then, in accordance with a membership function designation input corresponding to a label, a voltage distribution generator circuit which generates a designated membership function can be selected, and this output voltage distribution can be applied to a fuzzy inference engine. A selection switch array different from that described above would be necessary in order to apply the output voltage of the selected voltage distribution generator circuit to the fuzzy inference engine.

(2) Parallel processing type I

As mentioned earlier, a number of implication rules generally exist and these are connected by "else or also" or "and". A concrete example of a fuzzy computer of the type which simultaneously executes a plurality of fuzzy inferences for a plurality of implications on the premise that a plurality of implication rules exist will now be described.

Figure 32:
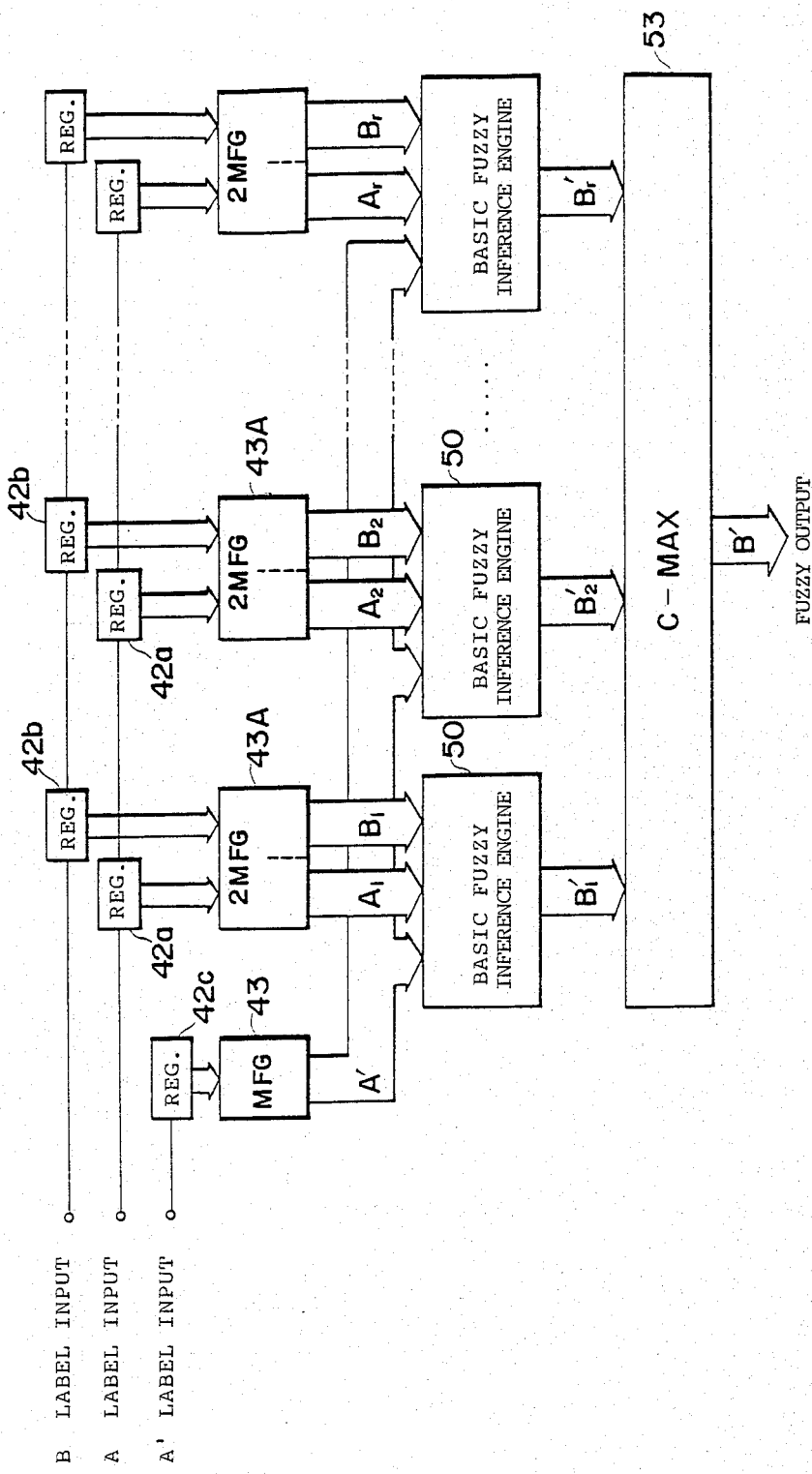
FIG. 32 is a block diagram illustrating an example of a parallel processing-type fuzzy computer using basic fuzzy inference engines.

As shown in FIG. 32, r-number of basic fuzzy inference engines 50 are provided on the premise that r-number of implication rules exist. A 2MFG 43A is provided for each of the inference engines 50 in order to generate two membership functions $A_k$, $B_k$ ($k=1-r$) in each implication and apply the membership functions to the inference engines 50. Each 2MFG 43A includes a combination of two MFGs in a single block. Since the fuzzy membership function A′ in the premise is common for all of the fuzzy inference engines 50, one MFG 43 is provided in order to generate the function A′. This output voltage distribution is applied to all of the inference engines 50.

Shift registers 42a, 42b are provided in order to apply the labels of the membership functions $A_k$, $B_k$ to each 2MFG 43A. The shift registers 42a are r in number and are connected in series. The binary data stored in each register 42a are applied to the corresponding 2MFG 43A in parallel fashion. By way of example, assuming that a label is expressed as three bits, each shift register 42a wil be a 3-bit shift register, so that the r shift registers 42a can be constituted by a (3 x r)-bit shift register. A label is set in each of the registers 42a by inputting serial data representing r labels. This is done first by serially inputting an $A_r$ label code from the label input terminal of function A, then inputting an $A_{r-1}$ label code from this input terminal, and so on. The foregoing description also holds for the registers 42b. As for a register 42c, it will suffice to serially input a 3-bit label representing A′. Accordingly, with the fuzzy computer shown in FIG. 32, a label memory is unnecessary. It will suffice to input each label by means of an input unit such as a keyboard.

When labels have been set in all of the registers 42a–42c, all of the 2MFGs 43A and the MFG 43 provide the fuzzy inference engines 50 with voltage distributions representing the corresponding fuzzy membership functions. Accordingly, the results of the inferences, e.g. $B_1'$, $B_2'$, ..., $B_r'$, are obtained from respective ones of the inference engines 50.

If the connective of a plurality of implications is given by "else or also", the connective is implemented by e.g. a C-MAX 53. The connective "and" is implemented by e.g. a C-MIN. Thus, an analog voltage distribution representing the final conclusion B′ is obtained from the C-MAX 53.

A fuzzy computer of this type would be used to hold a plurality of implications fixed and successively change the fuzzy membership function A′ of the premise, thereby obtaining the corresponding conclusions B′. Naturally, it is permissible to change the implication, depending upon the particular case.

It can be arranged for the labels of A, A′ and B to be applied not only manually from an input unit but also by using an already existing binary microprocessor.

If the MFG 43 and 2MFGs 43A possess a function which enables selection of the shape of a generated fuzzy membership function, as described above with reference to FIG. 29 or 30, one bit of data will be required. In such case, the registers 42a–42c would have to be 4-bit shift registers.

(3) Parallel processing type II

Figure 33:
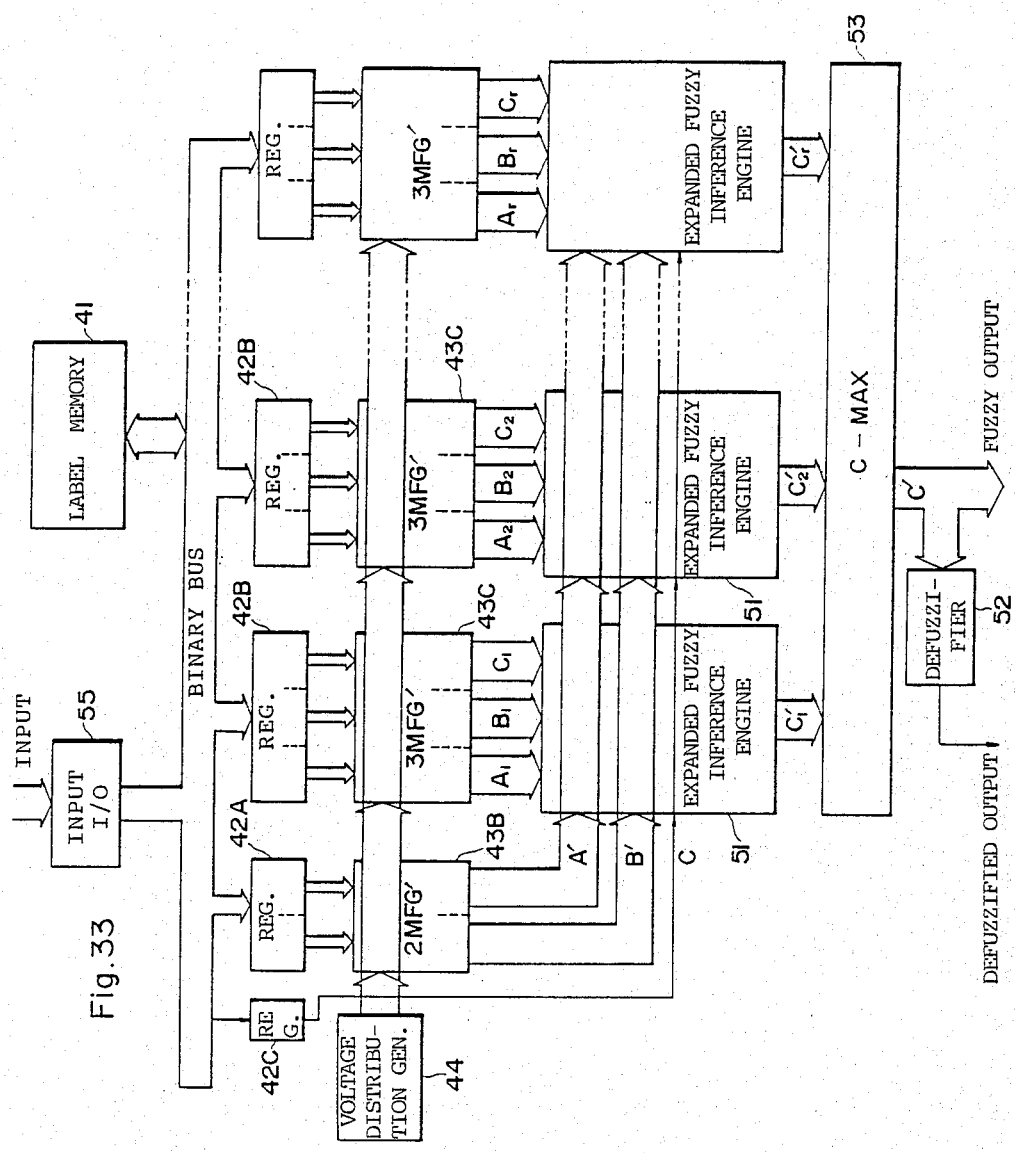
FIG. 33 is a block diagram illustrating an example of a parallel processing-type fuzzy computer using expanded fuzzy inference engines.

FIG. 33 illustrates a fuzzy computer using expanded fuzzy inference engines described earlier with reference to FIGS. 19 and 20. This fuzzy computer also is of the parallel processing type capable of simultaneously implementing a plurality of inferences premised on a plurality of implication rules.

As already described, the inputs which an expanded fuzzy inference engine 51 requires are three fuzzy membership functions $A_k$, $B_k$, $C_k$ ($k=1-r$) in an implication, membership functions A', B' in a premise, and a selection signal c for the conjunction "and/or" of an antecedent in an implication. A 3MFG' 43C is provided for each inference engine 51 in order to generate voltage distributions representing the membership functions $A_k$, $B_k$, $C_k$. Each 3MFG' comprises three MFG's represented as a single block. The prime symbol "'" means that the voltage distribution generator circuit 44 is omitted from the MFG. In other words, the MFG' comprises a decoder and a switch array, as shown in FIG. 30. Since the membership functions A', B' are common to all inference engines 51, one 2MFG'43B is provided in order to generate these functions. The output voltage of the voltage distribution generator circuit 44 is commonly applied to the 3MFG's 43C and 2MFG'43B. The 3MFG's 43C and 2MFG'43B are provided with labels from the corresponding registers 42B, 42A. The register 42C outputs the conjunction selection signal c, which is applied to all of the fuzzy inference engines 51.

The labels of a number of membership functions are inputted from an input unit 55 and are stored in the label memory 41 in advance. The memory 41 is accessed by a control unit, not shown, whereby predetermined labels are read out of the label memory 41 successively and are transferred to the registers 42A, 42B. Data representing the conjunction selection are also transferred to the register 42C. Thus, the 2MFG'43B and 3MFG's 43C generate voltage distributions representing the corresponding membership functions, and these voltage distributions are applied to the inference engines 51. In consequence, the inference results $C_1'$, $C_2'$, ..., $C_r'$ are obtained from the respective inference engines 51. These results are applied to the C-MAX 53, from which the final result C' is obtained. If necessary, the fuzzy output C' is converted into a non-fuzzy output by a defuzzifier 52.

(4) Sequential type

A sequential-type fuzzy computer is for implementing fuzzy inferences sequentially. Voltage distributions representing the sequentially obtained inference results are successively operated on and accumulated in accordance with the connection operation (MAX or MIN) of plural implications, and the accumulated results which prevail when all inferences end are the final results. Alternatively, final results are obtained by accumulating each of the inference results individually and then finally subjecting all of the inference results to a connection operation.

Figure 34:
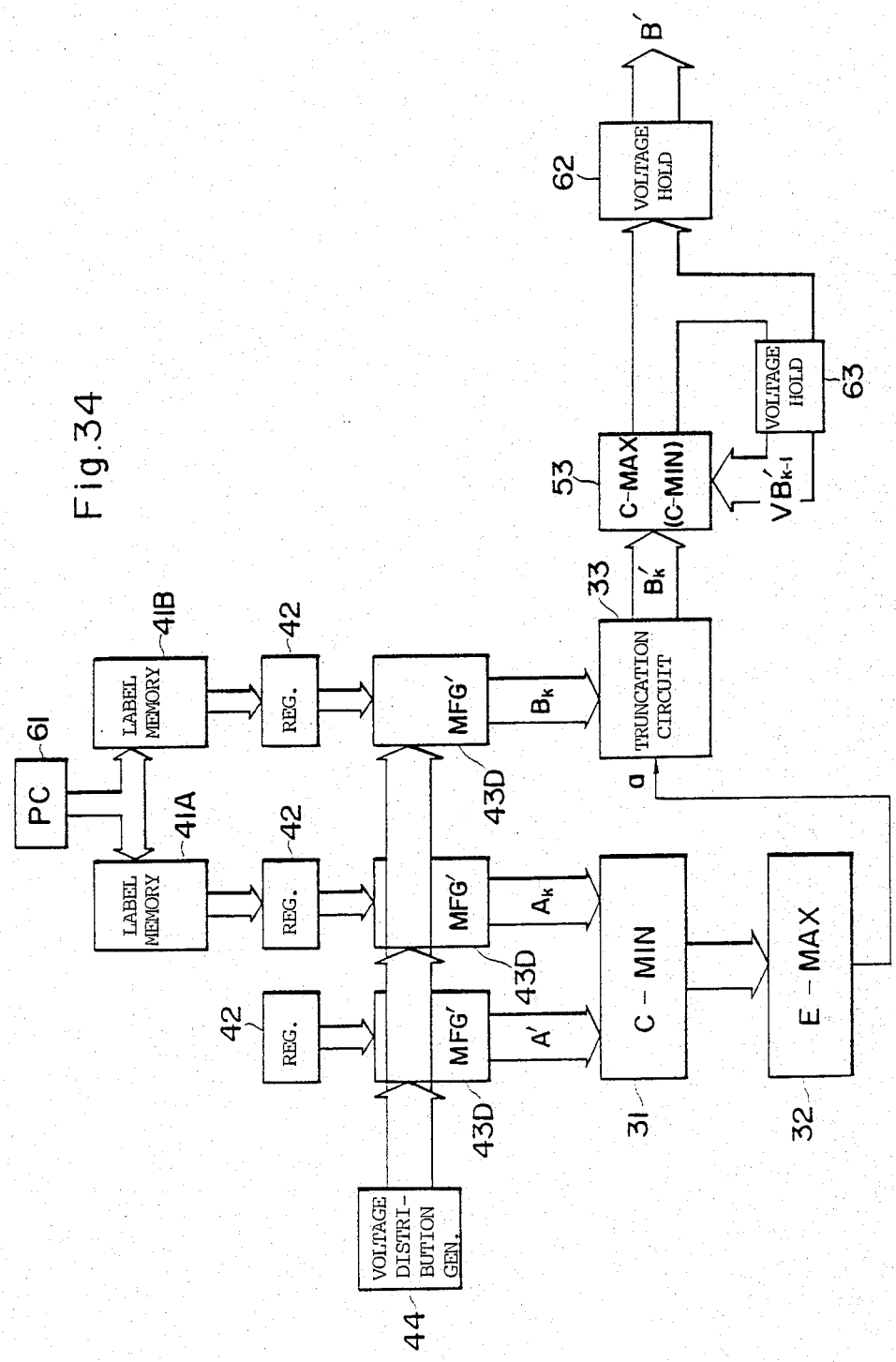
FIG. 34 is a block diagram illustrating an example of a sequential-type fuzzy computer.

FIG. 34 illustrates the general features of such a sequential-type fuzzy computer. For the sake of simplicity, a basic fuzzy inference engine is used. Employed as this engine is the Type III fuzzy inference engine (see FIG. 17) described above. This fuzzy computer performs a connection operation each time inference results are obtained.

It is assumed that there are r implications and that the fuzzy membership functions in these implications are $A_k$, $B_k$ ($k=1-r$). It is assumed that the labels of these membership functions are previously stored in each of the label memories 41A, 41B in the order in which the inferences are implemented, e.g. in the order $A_1, A_2, \ldots, A_k, \ldots, A_r$ and $B_1, B_2, \ldots, B_k, \ldots, B_r$. The addresses of the locations at which these labels are stored are designated by a program counter 61.

First, the labels $A_1$, $B_1$ are read out of the respective memories 41A, 41B, and the membership functions $A_1$, $B_1$ corresponding thereto are read out of the MFG's 43D and applied to the C-MIN 31 and truncation circuit 33. Also, the membership function A' of the premise is applied to the C-MIN 31. As a result, the inference result $B_1'$ is obtained from the truncation circuit 33 and stored temporarily in a voltage holding circuit 63 via the C-MAX (or C-MIN) 53. Next, in response to incrementing of the program counter 61, the labels of the next membership functions $A_2$, $B_2$ are read out of the memories 41A, 41B and these functions are applied to the fuzzy inference engine. Hence, the inference result $B_2'$ is obtained and applied to the C-MAX 53. The C-MAX 53 also is provided by the circuit 3 with the immediately preceding inference result $B_1'$ and therefore performs the operation $B_1' \quad B_2'$ (the result of this operation is represented by $$\overset{2}{\underset{B_k'}{}}$$

for convenience). This $$\overset{2}{\underset{B_k'}{}}$$

is stored in the circuit 63.

The inference results $B_3', \ldots, B_k'$ are successively obtained in the same manner and the MAX operation is applied to these inference results and the immediately preceding inference results.

$$\overset{2}{B_{k'}}, \ldots, \overset{K-1}{B_{k'}}.$$

The results of these operations are stored in the circuit 63.

When the last inference result $B_r'$ is finally obtained, the MAX operation is applied to $B_r'$ and $$\overset{r-1}{B_{k'}}$$

to acquire the final result.

$$B' = \overset{r}{\underset{k}{}} B_k.$$

This is stored temporarily in a voltage holding circuit 62. The above-described circuit operation would be carried out by providing gate circuits between the C-MAX 53 and circuit 63 and between the C-MAX 53 and circuit 62 and controlling the opening and closing of these gate circuits.

Figure 35:
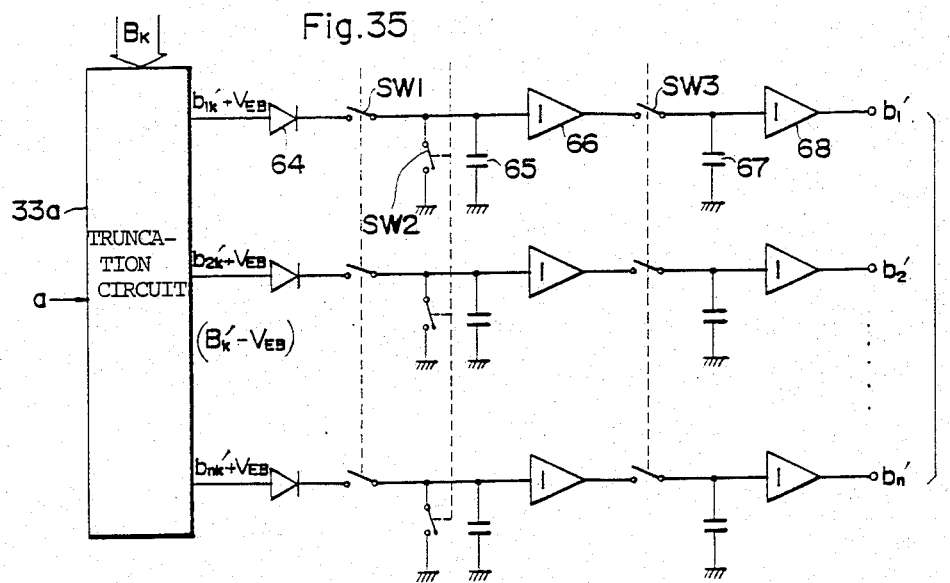
FIG. 35 is a circuit diagram illustrating a concrete example of a C-MAX and voltage-holding circuit in FIG. 34.
Figure 36:
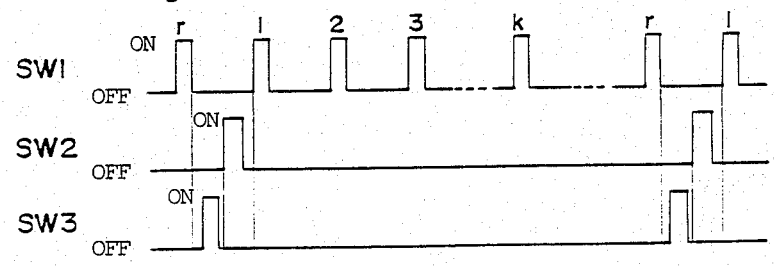
FIG. 36 is a time chart illustrating the operation of switches in FIG. 35.

FIG. 35 shows a concrete example of the C-MAX 53, voltage holding circuits 62, 63 and the aforementioned gate circuits. The truncation circuit is one from which the compensator is deleted. That is, this is the truncator of FIG. 8 and is designated by numeral 33a. Accordingly, the output of the truncation circuit 33a is that obtained by adding the emitter-base voltage $V_{EB}$ to the inference result Bk When the truncation circuit 33a outputs a voltage higher than the charging voltage of a capacitor 65, a diode 64 allows this voltage signal to pass and charge the capacitor 65, thereby acting as a MAX circuit. The diode 64 also acts to compensate for the abovementioned error $V_{EB}$ by dropping the forward voltage. The capacitor 65 corresponds to the voltage holding circuit 63, and a capacitor 67 corresponds to the voltage holding circuit 62. Switches SW1, SW2, SW3 are provided as the aforementioned gate circuits. These switches naturally are constituted by FETs or the like. The on/off action of these switches SW1–SW3 is illustrated in FIG. 36, in which 1, 2, 3, . . ., k, . . . , r represent the order of the inferences.

Before a series of inferences are implemented r times, the switch SW3 turns on in pulsed fashion, whereby the preceding result B' accumulated in the capacitor 65 is transferred to the capacitor 67 via a buffer amplifier 66. The voltage of capacitor 67 appears at the output terminal at all times through a buffer amplifier 68. These buffer amplifiers 66, 68 would be constructed using e.g. high-input impedance MOS input-type operational amplifiers. All of the charge in capacitor 65 is discharged by temporarily turning on the switch SW2.

When a first inference based on the fuzzy membership functions $A_1$, $B_1$ ends, the switch SW1 turns on for a brief instant, whereby a voltage distribution representing the inference result $B_1$ is transferred to the capacitor 65. When the second inference ends, the switch SW1 turns on in similar fashion. The voltage representing the second inference result $B_2'$ is sent to the capacitor 65 only if this voltage is higher. The MAX operation is performed and the results accumulated. The above-described circuit operation is repeated at the end of each inference. When the implementation of the r inferences end and the switch SW1 closes, the final inference result B', which is the result of the MAX operation applied to the results of all inferences, is accumulated in the capacitor 65.

As many apparently widely different embodiments of the present invention can be made without departing from the spirit and scope thereof, it is to be understood that the invention is not limited to the specific embodiments thereof except as defined in the appended claims.

What is claimed is:

1. A fuzzy computer comprising:
   a plurality of fuzzy membership function generator circuits, each of said fuzzy membership generator signal distributed on a plurality of lines which represents a predetermined fuzzy membership function, and
   a fuzzy inference engine which receives as inputs the electric signals outputted by said plurality of fuzzy membership function generator circuits, said fuzzy inference engine executing a predetermined fuzzy operation and for outputting the result of said operation as an electric signal distributed on a plurality of lines.

2. A fuzzy computer comprising:
   a fuzzy memory for successively outputting a plurality of fuzzy membership electric signals, each said fuzzy membership electric signal being distributed on a plurality of lines in accordance with a predetermined sequence;
   a fuzzy inference engine which receives as inputs a plurality of outputs from said fuzzy memory for successively executing predetermined fuzzy operations and successively outputting the results of said operations; and
   an output circuit for executing a predetermined connective operation with regard to the result of each fuzzy operation successively outputted by said fuzzy inference engine.

3. A fuzzy inference engine for executing a modus ponens in which an antecedent includes an implication having no fuzzy proportions, said fuzzy inference engine comprising:
   arithmetic circuits for computing a conjunction "and-/or" of the two fuzzy propositions, and
   a switching circuit for selecting a conjunction computing circuit independence upon a conjunction selection input.

4. A fuzzy membership function generator comprising:
   an electric signal distribution generator circuit for generating a plurality of electric signal groups, each of said electric signal groups containing an electric signal distributed on a plurality of lines said plurality of electric signal groups representing a plurality of fuzzy membership functions each having a different shape, and
   a selections switch circuit for selecting any one of said electric signal groups in dependence upon a selection signal.

5. The fuzzy membership function generator according to claim 4, further comprising a switch array connected to the output of said electric signal distribution generator circuit, said switch array delivering an output of said electric signal distribution generator circuit to a predetermined plurality of output signal lines.

6. A fuzzy membership function generator comprising:
   an electric signal distribution generator circuit for generating an electric signal, which is distributed on a plurality of lines, representing a basic fuzzy membership function having a predetermined shape;
   a plurality of output terminals respectively corresponding to said plurality of lines of said distribution generator circuit; and
   a pass array comprising a switch group and a line group for connecting lines of said electric signal distribution generator circuit to said output terminals at respective positions corresponding to said lines or at respective positions shifted a predetermined number of lines from said lines of said distribution generator circuit.

7. The fuzzy membership function generator according to claim 6, further comprising a decoder for decoding a code designative a fuzzy membership function and outputting a signal, said signal controlling an on/off action of said switch group in dependence upon the code.

8. A MIN/MAX circuit comprising:
   a first comparator for performing a MIN operation and which includes a first plurality of three-terminal control elements having control terminals to which inputs are respectively applied and carrier injection terminals connected in common to form an output terminal, said first plurality of three-terminal control elements being connected in such a manner that a three-terminal control element of said first plurality of three-terminal control elements which has the smallest input applied thereto is rendered conductive; and a second comparator for performing a MAX operation and which includes a second plurality of three-terminal control elements having control terminals to which inputs are respectively applied and carrier injection terminals connected in common to form output terminals, said second plurality of three-terminal control elements being connected in such a manner that a three-terminal control element of said second plurality of three-terminal control elements which has the largest input applied thereto is rendered conductive;

said first and second comparators being connected in cascade.

* * * * *